(12) United States Patent
Lv et al.

(10) Patent No.: US 12,519,422 B2
(45) Date of Patent: Jan. 6, 2026

(54) ABNORMALITY DIAGNOSIS METHOD OF PHOTOVOLTAIC POWER GENERATION, DEVICE, COMPUTER DEVICE AND STORAGE MEDIUM

(71) Applicants: THREE GORGES GROUP INDUSTRIAL DEVELOPMENT (BEIJING) CO., LTD, Beijing (CN); CHINA THREE GORGES CORPORATION, Wuhan (CN)

(72) Inventors: Tingyan Lv, Wuhan (CN); Min Chen, Wuhan (CN); Rong Kang, Wuhan (CN); Xinya Liu, Wuhan (CN); Kehan Li, Wuhan (CN)

(73) Assignees: THREE GORGES GROUP INDUSTRIAL DEVELOPMENT (BEIJING) CO., LTD, Beijing (CN); CHINA THREE GORGES CORPORATION, Wuhan (CN)

( * ) Notice: Subject to any disclaimer, the term of this patent is extended or adjusted under 35 U.S.C. 154(b) by 0 days.

(21) Appl. No.: 19/083,445

(22) Filed: Mar. 19, 2025

(65) Prior Publication Data
US 2025/0317103 A1    Oct. 9, 2025

(30) Foreign Application Priority Data
Apr. 3, 2024  (CN) .......................... 202410399492.X

(51) Int. Cl.
*H02S 50/00* (2014.01)
*H02J 3/00* (2006.01)
*H02J 3/38* (2006.01)

(52) U.S. Cl.
CPC .............. *H02S 50/00* (2013.01); *H02J 3/004* (2020.01); *H02J 3/38* (2013.01); *H02J 2203/20* (2020.01); *H02J 2300/24* (2020.01)

(58) Field of Classification Search
CPC ... H02S 50/00; H02J 3/004; H02J 3/38; H02J 2203/20; H02J 2300/24
See application file for complete search history.

(56) References Cited

U.S. PATENT DOCUMENTS

2021/0021233 A1* 1/2021 Hoff ...................... G06Q 50/06
2021/0104975 A1* 4/2021 Sarwat .................... H02S 40/38

FOREIGN PATENT DOCUMENTS

CN          103840742 B  *  1/2016  ............. Y02E 10/50
CN          105337575 A      2/2016
(Continued)

Primary Examiner — Tung S Lau
(74) Attorney, Agent, or Firm — Bayramoglu Law Offices LLC

(57) ABSTRACT

Disclosed are an abnormality diagnosis method and apparatus for photovoltaic power generation, a computer device and a storage medium. The method comprises acquiring operation data of a photovoltaic station, generating a photovoltaic power generation capacity prediction model by training a preset neural network based on the operation data of the photovoltaic station; determining an abnormal photovoltaic station by performing daily power generation capacity fluctuation evaluation and power generation efficiency evaluation on a plurality of photovoltaic stations using the photovoltaic power generation capacity prediction model; and generating a diagnosis result of the photovoltaic power generation abnormality by comparing the operation data corresponding to the abnormal photovoltaic station with an abnormality condition. According to the method, accurate evaluation of a photovoltaic power generation operation situation and accurate determining of the photovoltaic power generation abnormality are realized, and a brand new perspective is provided for operation management of the photovoltaic station.

12 Claims, 9 Drawing Sheets acquiring operation data of a photovoltaic station, generating a photovoltaic power generation capacity prediction model by training a preset neural network based on the operation data of the photovoltaic station  — S101 determining an abnormal photovoltaic station by performing daily power generation capacity fluctuation evaluation and power generation efficiency evaluation on a plurality of photovoltaic stations using the photovoltaic power generation capacity prediction model  — S102 generating a diagnosis result of the photovoltaic power generation abnormality by comparing the operation data corresponding to the abnormal photovoltaic station with an abnormality condition  — S103

(56) References Cited

FOREIGN PATENT DOCUMENTS

| | | | | | |
|---|---|---|---|---|---|
| CN | 106411257 | A | * | 2/2017 | ............. G06F 17/10 |
| CN | 110518880 | A | | 11/2019 | |
| CN | 111313830 | A | * | 6/2020 | ............. H02S 50/00 |
| CN | 113988608 | A | | 1/2022 | |
| CN | 115760057 | A | | 3/2023 | |
| CN | 115983447 | A | | 4/2023 | |
| CN | 117520986 | A | | 2/2024 | |
| CN | 117993741 | A | * | 5/2024 | ............... G06N 3/08 |
| CN | 118312813 | A | * | 7/2024 | ............. G06Q 50/06 |
| CN | 118590002 | A | * | 9/2024 | ................ H02J 3/38 |
| WO | 2014119822 | A1 | | 8/2014 | |

\* cited by examiner

ABNORMALITY DIAGNOSIS METHOD OF PHOTOVOLTAIC POWER GENERATION, DEVICE, COMPUTER DEVICE AND STORAGE MEDIUM

CROSS REFERENCE TO THE RELATED APPLICATIONS

This application claims priority based on Chinese patent application No. 202410399492.X filed on Apr. 3, 2024, the entire contents of which are hereby incorporated by reference.

TECHNICAL FIELD

The present disclosure relates to the technical field of photovoltaic power generation, and more particularly, to an abnormality diagnosis method of photovoltaic power generation, device, computer device and storage medium.

BACKGROUND

With the development of clean energy transformation, new energy represented by photovoltaic energy will replace traditional thermal power generation as main energy in the future. With more and more photovoltaic stations put into operation, how to do lean operation and improve power generation efficiency will become the focus of production management.

However, at present, the operation and overhaul mode of each station based on manual inspection is difficult to grasp the production and operation situations of devices in time and accurately, and the untimely overhaul operation of some devices will lead to the decline of operating efficiency.

SUMMARY

In order to solve the above technical problems, the present disclosure provides an abnormality diagnosis method of photovoltaic power generation, device, computer device and storage medium, which solve a defect that a traditional manual patrol operation and overhaul mode cannot accurately grasp production and operation situations in time through production data collection, operation index calculation and diagnosis rule matching, and give advice on device overhaul accordingly to improve an operating efficiency of a station.

A technical solution employed by the present disclosure is as follows.

In a first aspect, the embodiments of the present disclosure provide an abnormality diagnosis method for photovoltaic power generation, including the following steps of:
step 1: acquiring operation data of a photovoltaic station, generating a photovoltaic power generation capacity prediction model by training a preset neural network based on the operation data of the photovoltaic station;
step 2: determining an abnormal photovoltaic station by performing daily power generation capacity fluctuation evaluation and power generation efficiency evaluation on a plurality of photovoltaic stations using the photovoltaic power generation capacity prediction model; and
step 3: generating a diagnosis result of the photovoltaic power generation abnormality by comparing the operation data corresponding to the abnormal photovoltaic station with an abnormality condition.

In the step 1, the operation data of the photovoltaic station includes average daily irradiance data, battery temperature data and weather data;

In the step 1, the generating the photovoltaic power generation capacity prediction model includes the following steps of:
A1: generating filtered average daily irradiance data by filtering the average daily irradiance data;
A2: determining a photovoltaic station correction coefficient based on the filtered average daily irradiance data and the battery temperature data;
A3: generating a power temperature correction coefficient by training the preset neural network based on the photovoltaic station correction coefficient and the weather data; and
A4: generating the photovoltaic power generation capacity prediction model based on the filtered average daily irradiance data, the photovoltaic station correction coefficient and the power temperature correction coefficient.

the step A1 includes the following steps of:
a1: acquiring power generation capacity data corresponding to the average daily irradiance data, and determining a daily power generation capacity of the station and average daily irradiance of the station by filtering the average daily irradiance data and the power generation capacity data greater than preset thresholds;
a2: identifying irradiance abnormality points based on the daily power generation capacity of the station and the average daily irradiance of the station, and filtering the irradiance abnormality points;
a3: generating a pre-training result by pre-training the preset neural network based on the irradiance data after filtering the irradiance abnormality points; and
a4: determining outliers of the irradiance data after filtering the irradiance abnormality points based on the pre-training result, and generating the filtered average daily irradiance data by deleting the outliers.

the step a2 includes the following steps of:
a2.1: generating irradiance in each power generation capacity interval by dividing the daily power generation capacity of the station into a plurality of power generation capacity intervals and mapping the average daily irradiance of the station to the plurality of power generation capacity intervals; and
a2.2: determining a segmented box plot based on the irradiance in each power generation capacity interval, and identifying and filtering the irradiance abnormality points based on the segmented box plot.

In the step A2, the photovoltaic station correction coefficient is generated by using a linear regression method based on the filtered average daily irradiance data and the battery temperature data.

in the step A3, an expression of the photovoltaic power generation capacity prediction model is shown as follows:

$$PE_d = k \times P_{predTarg} \times \frac{G_{meas}}{G_{TRC}} \times [1 + \delta(T_C - T_{TRC}) \times 24];$$

in the expression, $PE_d$ represents the predicted power generation capacity of the photovoltaic station on the current day, k represents the photovoltaic station correction coefficient, $P_{predTarg}$ represents a power generation capacity of a photovoltaic component under a target environmental condition, $G_{meas}$ represents unit area irradiance of the photovoltaic component in the same plane, $G_{TRC}$ represents average daily irradiance corresponding to the power generation capacity of the photovoltaic component under the target environmental condition, δ represents the power temperature correction coefficient, $T_C$ represents a measured battery temperature value of the photovoltaic component, and $T_{TRC}$ represents a battery temperature value corresponding to the power generation capacity of the photovoltaic component under the target environmental condition.

The step 2 includes the following steps of:

B1: acquiring power generation capacities of the photovoltaic station on the current day and a previous day, and calculating a daily power generation capacity fluctuating value based on the power generation capacities of the photovoltaic station on the current day and the previous day;

B2: collecting real-time operation data of the photovoltaic station, and generating the predicted power generation capacity of the photovoltaic station on the current day by inputting the real-time operation data of the photovoltaic station into the photovoltaic power generation capacity prediction model;

B3: calculating a power generation efficiency of the photovoltaic station based on the predicted power generation capacity of the photovoltaic station on the current day and the real-time power generation capacity of the photovoltaic station on the current day; and B4: identifying the abnormal photovoltaic station based on the daily power generation capacity fluctuating value and the power generation efficiency of the photovoltaic station.

The step 3 method includes the following steps of:

C1: calculating an operational indicator value of the photovoltaic station based on the operation data corresponding to the abnormal photovoltaic station; and C2: generating the diagnosis result of the photovoltaic power generation abnormality by comparing the operational indicator value of the photovoltaic station with the abnormality condition.

In the C1, the operational indicator value of the photovoltaic station includes a resource change value, a power loss value and an inverter operation state statistical value; and the calculating the operational indicator value of the photovoltaic station based on the operation data corresponding to the abnormal photovoltaic station includes:

c1: determining average daily irradiance of the abnormal photovoltaic station on the current day and average daily irradiance of the abnormal photovoltaic station on the previous day based on the operation data corresponding to the abnormal photovoltaic station, and calculating a day-on-day change rate of resources based on the average daily irradiance on the current day and the average daily irradiance on the previous day;

c2: determining a power loss of the station on the current day and a power loss of the station on the previous day based on the operation data corresponding to the abnormal photovoltaic station; and c3: determining a number of station inverters and unit state data of the station inverters based on the operation data corresponding to the abnormal photovoltaic station, and calculating the inverter operation state statistical value on the current day and the inverter operation state statistical value on the previous day based on the number of station inverters and the unit state data of the station inverters.

The operational indicator value of the photovoltaic station further includes an inverter output power dispersion ratio, a photovoltaic array energy conversion efficiency, an inverter loss rate and an inverter outage situation; and the calculating the operational indicator value of the photovoltaic station based on the operation data corresponding to the abnormal photovoltaic station further includes:

c4: determining station inverter output powers based on the operation data corresponding to the abnormal photovoltaic station, and calculating an inverter output power dispersion ratio of the whole station based on the station inverter output powers;

c5: determining a direct current power quantity of the station inverter, a photovoltaic array effective area and a total radiation quantity of an inclined plane based on the operation data corresponding to the abnormal photovoltaic station, and calculating the photovoltaic array energy conversion efficiency based on the direct current power quantity of the station inverter, the photovoltaic array effective area and the total radiation quantity of the inclined plane;

c6: determining an inverter direct current side power and an inverter alternating current side power based on the operation data corresponding to the abnormal photovoltaic station, and calculating the inverter loss rate based on the inverter direct current side power and the inverter alternating current side power; and c7: determining a daily power generation capacity of the station inverter based on the operation data corresponding to the abnormal photovoltaic station, and determining the inverter outage situation based on the daily power generation capacity of the station inverter.

in the step c4, a standard deviation and an average value of the station inverter output powers are determined based on the station inverter output powers and the number of station inverters, and the inverter output power dispersion ratio of the whole station is calculated based on the standard deviation and the average value of the station inverter output powers.

the step C2 includes the following steps of:

c2.1: comparing the day-on-day change rate of resources with a preset resource threshold, and determining the diagnosis result of the photovoltaic power generation abnormality being caused by resource fluctuation in the case that the day-on-day change rate of resources is greater than the preset resource threshold;

c2.2: determining proportions and day-on-day ratios of a power loss due to failure, a power loss due to overhaul, a power loss due to power restriction and a power loss due to accompanying shutdown based on a power loss value on the current day and a power loss value on previous day and a power generation capacity value of the station;

c2.3: determining a day-on-day ratio of shutdown duration due to failure, a day-on-day ratio of normal shutdown duration, a day-on-day ratio of shutdown duration due to power restriction and a day-on-day ratio of shutdown duration due to external factors based on the inverter operation state statistical value;

c2.4: in the case that the proportion of the power loss due to failure is greater than a preset threshold, or the proportion of the shutdown duration due to failure is greater than a preset shutdown duration threshold, determining the diagnosis result of the photovoltaic power generation abnormality being that the photovoltaic power generation abnormality is caused by device failure;

in the case that the proportion of the power loss due to overhaul is greater than a preset power loss threshold, or the proportion or the day-on-day ratio of the normal shutdown duration due to failure is greater than the preset shutdown duration threshold, determining the diagnosis result of the photovoltaic power generation abnormality being that the photovoltaic power generation abnormality is caused by overhaul;

in the case that the proportion of the power loss due to power restriction is greater than the preset power loss threshold, or the proportion or the day-on-day ratio of the shutdown duration due to power restriction is greater than the preset shutdown duration threshold, determining the diagnosis result of the photovoltaic power generation abnormality being that the photovoltaic power generation abnormality is caused by power restriction; and in the case that the proportion of the power loss due to accompanying shutdown is greater than the preset power loss threshold, or the proportion or the day-on-day ratio of the shutdown duration due to external factors is greater than the preset shutdown duration threshold, determining the diagnosis result of the photovoltaic power generation abnormality being that the photovoltaic power generation abnormality is caused by accompanying shutdown.

In a second aspect, the present disclosure provides an abnormality diagnosis apparatus for photovoltaic power generation, wherein the apparatus includes:

a training module configured for acquiring operation data of a photovoltaic station, generating a photovoltaic power generation capacity prediction model by training a preset neural network based on the operation data of the photovoltaic station, and determining a predicted power generation capacity of the station;

an evaluating module configured for determining a photovoltaic station with abnormal power generation capacity by performing daily power generation capacity fluctuation evaluation and power generation efficiency evaluation on a plurality of photovoltaic stations using a photovoltaic power generation capacity prediction result; and an abnormality diagnosis module configured for generating a diagnosis result of the photovoltaic power generation abnormality by comparing the operation data corresponding to the abnormal photovoltaic station with a diagnosis determining condition.

In a third aspect, the embodiments of the present disclosure provide a computer device, including:

a processor and a memory, wherein the memory and the processor are connected in communication with each other, a computer instruction is stored in the memory, and the processor executes the computer instruction, thereby executing the abnormality diagnosis method for photovoltaic power generation.

In a fourth aspect, the embodiments of the present disclosure provide a computer-readable storage medium, wherein the computer-readable storage medium stores a computer instruction thereon, and the computer instruction is used to enable a computer to execute the abnormality diagnosis method for photovoltaic power generation.

The abnormality diagnosis method for photovoltaic power generation, the abnormality diagnosis apparatus for photovoltaic power generation, the computer device and the storage medium have the technical effects as follows.

1) According to the abnormality diagnosis method for photovoltaic power generation provided by the present disclosure, the daily power generation fluctuation evaluation and the power generation efficiency evaluation are respectively performed on the plurality of photovoltaic stations by using the photovoltaic power generation capacity prediction model, the photovoltaic station with abnormal power generation capacity is determined, and then the operation indexes corresponding to the abnormal photovoltaic station are compared with diagnosis determining condition to generate the diagnosis result of the photovoltaic power generation abnormality, so that accurate evaluation of the photovoltaic power generation operation situation and accurate determining of abnormal reasons of the photovoltaic power generation capacity are realized, and reference opinions are provided for improving the photovoltaic power generation operating efficiency.

2) According to the photovoltaic power generation capacity prediction model provided by the present disclosure, by filtering the average daily irradiance data and determining the photovoltaic station correction coefficient and the power temperature correction coefficient, the generating of the photovoltaic power generation capacity prediction model is more accurate, and the accuracy of the photovoltaic power generation capacity prediction value is improved.

3). According to the abnormality diagnosis method for photovoltaic power generation provided by the present disclosure, by pre-training the preset machine learning model and determining the outliers the irradiance data after filtering the irradiance abnormality points based on a Cook distance of the pre-training result, the accurate identification of the outliers is realized, and the accuracy of the training data in the training process of the photovoltaic power generation capacity prediction model is improved.

4) According to the photovoltaic power generation capacity prediction model provided by the present disclosure, the intuitive and accurate identification of the irradiance abnormality points is realized by using the segmented box plot, so that the training data is more accurate.

5) According to the abnormality diagnosis method for photovoltaic power generation provided by the present disclosure, considering that linear regression has low requirements on a volume of training data and is sensitive to the abnormal points which will directly affect the change of the photovoltaic station correction coefficient, linear regression can realize the accurate calculation of the photovoltaic station correction coefficient for daily-reported data, while the preset neural network is more inclusive to the abnormal points, and a small number of abnormal points will not affect the training effect. The photovoltaic power generation capacity prediction model is more accurate and stable by using the linear regression and the preset neural network.

6) According to the abnormality diagnosis method for photovoltaic power generation provided by the present disclosure, by calculating the daily power generation capacity fluctuating value and the power generation efficiency of the photovoltaic station, the power generation efficiency and the daily power generation capacity of each photovoltaic station can be known timely, the station with low power generation efficiency and obvious reduction of power generation capacity can be identified timely, the overall identification of list of stations that need to be focused on every day is identified timely, and key objects of concern are oriented.

7) According to the abnormality diagnosis method for photovoltaic power generation provided by the present disclosure, combined with the operational indicator value of the photovoltaic station, the reasons for low power generation efficiency and obvious reduction of power generation capacity are initially found out, and business departments are supported to establish a mechanism of "finding problems, feeding back problems and rectifying problems" in management.

8) According to the abnormality diagnosis method for photovoltaic power generation provided by the present disclosure, based on the operational indicator value of the photovoltaic station such as the inverter operation state, the output power dispersion ratio, the loss situation and the outage situation, the specific reasons for the day-on-day ratio decrease of the power generation capacity of the photovoltaic station or significantly lower than the predicted value are further diagnosed.

9) According to the abnormality diagnosis method for photovoltaic power generation provided by the present disclosure, the operational indicator value of the photovoltaic station is compared with the abnormality condition, thus realizing targeted diagnosis of the abnormality of photovoltaic power generation, improving the accuracy of the diagnosis result of the photovoltaic power generation abnormality, and laying a foundation for improving the photovoltaic power generation operating efficiency subsequently.

BRIEF DESCRIPTION OF THE DRAWINGS

The present disclosure is further explained with reference to the drawings and embodiments hereinafter.

DETAILED DESCRIPTION OF THE EMBODIMENTS

Figure 1:
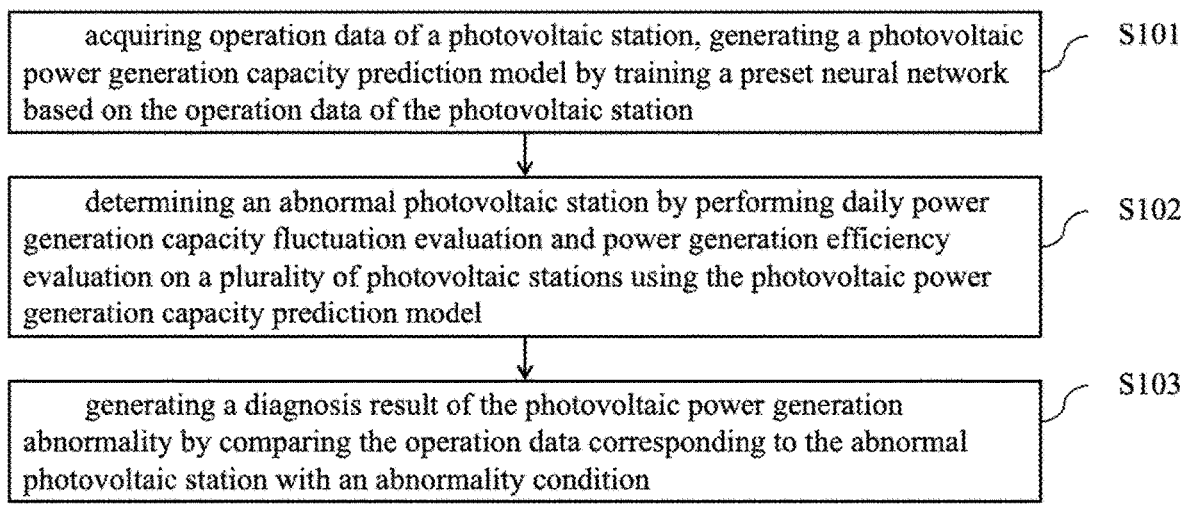
FIG. 1 is a flow chart of an abnormality diagnosis method for photovoltaic power generation according to the embodiments of the present disclosure.

In the embodiment, an abnormality diagnosis method for photovoltaic power generation is provided, which may be used for the above-mentioned mobile terminals, such as mobile phones, tablet computers, etc. FIG. 1 is a flow chart of the abnormality diagnosis method for photovoltaic power generation according to the embodiments of the present disclosure. As shown in FIG. 1, the flow chart includes the following steps:

At step S1101, acquiring operation data of a photovoltaic station, and generating a photovoltaic power generation capacity prediction model by training a preset neural network based on the operation data of the photovoltaic station.

Specifically, average daily irradiance and daily-reported temperature of the station are used for experiments to calculate a theoretical power generation capacity value on the current day; alternatively, centralized control real-time active power and irradiance of the station are used for experiments, and a theoretical active power of the station at a certain moment can be calculated through the model; wherein, the operation data of the photovoltaic station is shown in Table 1 below.

TABLE 1

Table of Operation Data of Photovoltaic Station

| Number | Datum | Granularity | Frequency | Source of data |
|---|---|---|---|---|
| 1 | Weather | Station | Day | Daily power production report |
| 2 | Daily minimum and maximum temperature | Station | Day | Daily power production report |
| 3 | Average daily irradiance | Station | Day | Daily power production report |
| 4 | Power loss (failure, overhaul, power restriction, accompanying shutdown) | Station | Day | Daily power production report |
| 5 | Irradiance | Station | Real time (10 minutes) | Centralized control system |
| 6 | Alternating current side active power | Inverter | Real time (10 minutes) | Centralized control system |
| 7 | Direct current side active power | Inverter | Real time (10 minutes) | Centralized control system |
| 8 | Real-time daily power generation capacity | Inverter | Real time (10 minutes) | Centralized control system |
| 9 | Operation state | Inverter | Real time (10 minutes) | Centralized control system |
| 10 | Rated power | Inverter | Real time (10 minutes) | Centralized control system |

Further, the preset neural network may be neural networks such as Artificial Neural Network (ANN), Convolutional Neural Networks (CNN) and Recurrent Neural Network (RNN).

At step S102, determining an abnormal photovoltaic station by performing daily power generation capacity fluctuation evaluation and power generation efficiency evaluation on a plurality of photovoltaic stations using the photovoltaic power generation capacity prediction model.

At step S103, generating a diagnosis result of the photovoltaic power generation abnormality by comparing the operation data corresponding to the abnormal photovoltaic station with an abnormality condition.

According to the abnormality diagnosis method for photovoltaic power generation provided by the present disclosure, the daily power generation fluctuation evaluation and the power generation efficiency evaluation are respectively performed on the plurality of photovoltaic stations by using the photovoltaic power generation capacity prediction model, the photovoltaic station with abnormal power generation capacity is determined, and then the operation data corresponding to the abnormal photovoltaic station is compared with the abnormality condition to generate the diagnosis result of the photovoltaic power generation abnormality, so that accurate evaluation of a photovoltaic power generation operation situation and accurate determining of abnormal photovoltaic power generation are realized, and a foundation is laid for improving photovoltaic power generation operating efficiency.

Figure 2:
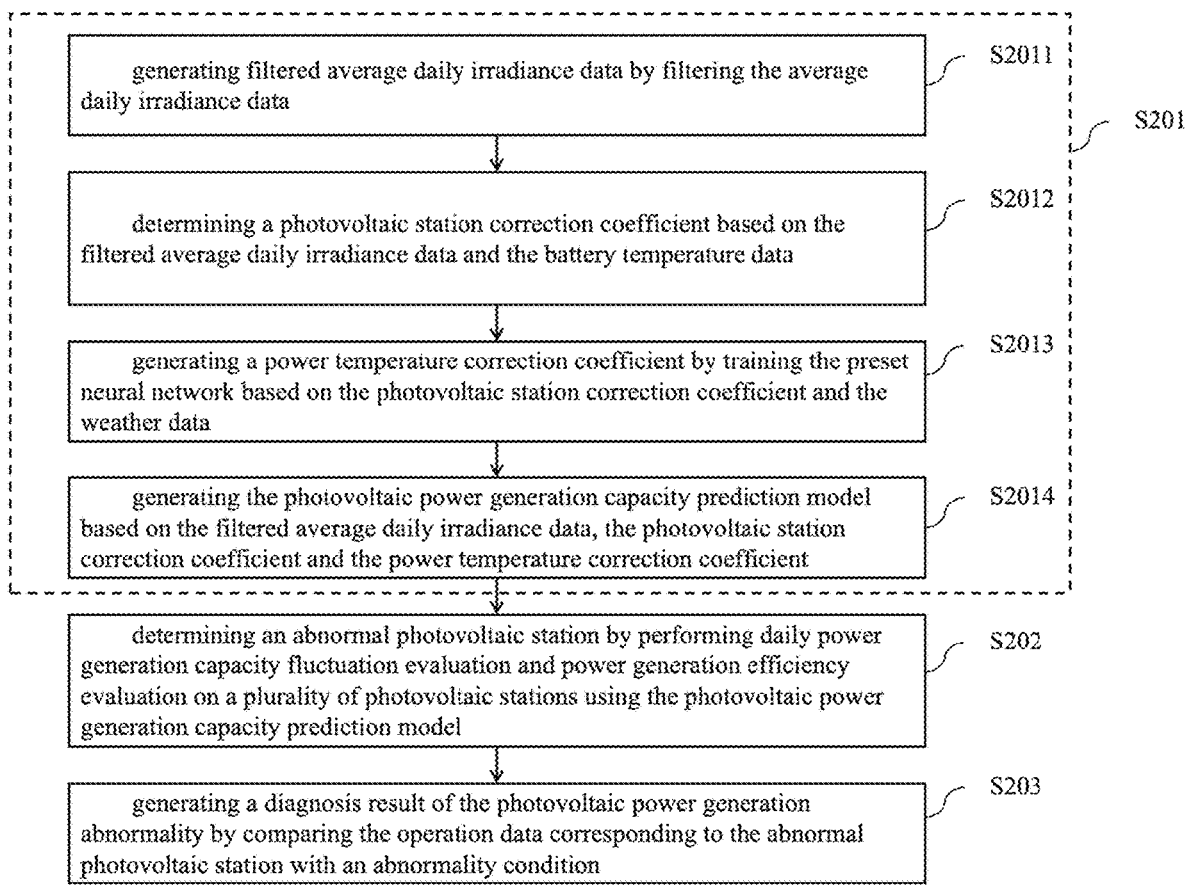
FIG. 2 is a flow chart of another abnormality diagnosis method for photovoltaic power generation according to the embodiments of the present disclosure.

In the embodiment, an abnormality diagnosis method for photovoltaic power generation is provided, which may be used for the above-mentioned mobile terminals, such as mobile phones, tablet computers, etc. FIG. 2 is a flow chart of the abnormality diagnosis method for photovoltaic power generation according to the embodiments of the present disclosure. As shown in FIG. 2, the flow chart includes the following steps.

At step S201, acquiring operation data of a photovoltaic station are acquired, and generating a photovoltaic power generation capacity prediction model by training a preset neural network based on the operation data of the photovoltaic station.

Specifically, the operation data of the photovoltaic station includes average daily irradiance data, battery temperature data and weather data. The step S201 above includes:

Step S2011: generating filtered average daily irradiance data by filtering the average daily irradiance data.

In some optional embodiments, the step further S2011 above includes the following steps.

At step a1, acquiring power generation capacity data corresponding to the average daily irradiance data, and determining a daily power generation capacity of the station and average daily irradiance of the station by filtering the average daily irradiance data and the power generation capacity data greater than preset thresholds.

Specifically, in order to avoid the influence of transmission stability on model training as much as possible, observation point stations corresponding to the average daily irradiance data greater than 0 and the power generation capacity data greater 0 are screened.

At step a2, identifying irradiance abnormality points based on the daily power generation capacity of the station and the average daily irradiance of the station, and filtering the irradiance abnormality points.

Specifically, the daily power generation capacity of the station is divided into a plurality of power generation capacity intervals, the average daily irradiance of the station is mapped to the plurality of power generation capacity intervals, and irradiance in each power generation capacity interval is generated. A segmented box plot is determined based on the irradiance in each power generation capacity interval, and the irradiance abnormality points are identified and filtered based on the segmented box plot.

Figure 3:
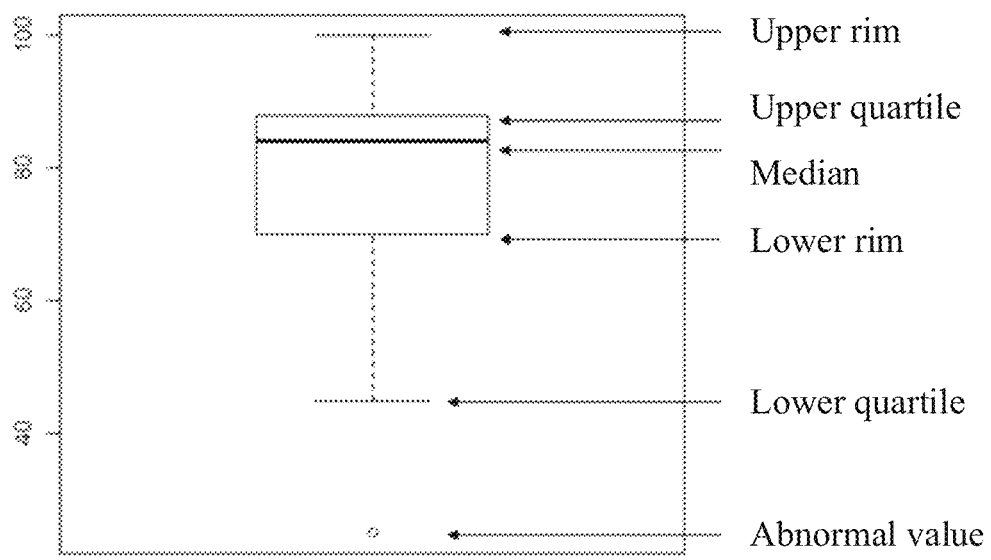
FIG. 3 is a schematic diagram showing a basic principle of a box plot according to the embodiments of the present disclosure.

Further, As shown in FIG. 3, the box plot consists of five numerical points, which are respectively the minimum observed value (lower rim)=Q1+1.5IQR, the upper quartile (Q1), the median, the lower quartile (Q3) and the maximum observed value (upper rim)=Q3+1.5IQR, wherein IQR represents that the data falls in a middle span by 50%, and IQR=the lower quartile (Q3)−the upper quartile (Q1). If there is an outlier in the data, i.e. abnormal value, outliers, and the outlier exceeds the maximum or minimum observed value, the outlier will be displayed in the form of "dot" in this case.

Figure 4:
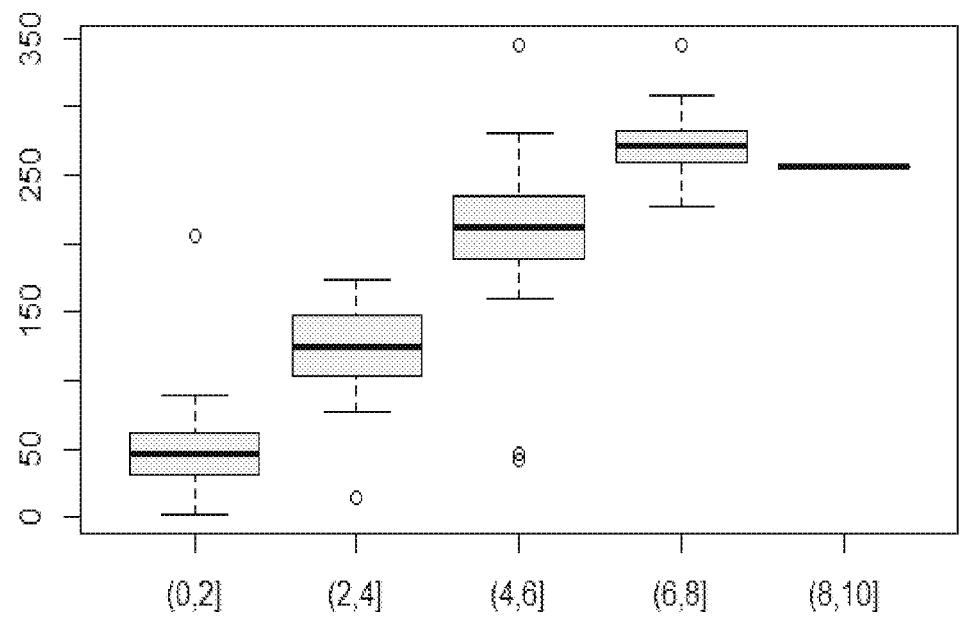
FIG. 4 is a schematic diagram of a segmented box plot according to the embodiments of the present disclosure.

Further, as shown in FIG. 4, the power generation capacity is divided into intervals, so that the irradiance in each power generation capacity interval after dividing covers equidistant intervals of all power generation capacity values. By default, a number of intervals is a power of 2 or 5 times 10, which is generally divided into five intervals, i.e., (0,2], (2,4], (4,6], (6,8] and (8,10]. Then, a box plot of the irradiance in each power generation capacity interval is made to identify and filter the corresponding outliers. The box plot is made for the irradiance in each power generation interval separately, and there are five independent box plots in FIG. 4, thus generating the segmented box plot. In addition, it can be seen from the segmented box plot that the irradiance shows an upward trend with the increase of the power generation capacity interval.

At step a3, generating a pre-training result by pre-training the preset neural network based on the irradiance data after filtering the irradiance abnormality points.

At step a4, determining outliers of the irradiance data after filtering the irradiance abnormality points based on the pre-training result, and generating the filtered average daily irradiance data by deleting the outliers.

Specifically, it may pre-train the preset neural network, and calculate a Cook distance based on the pre-training result, so as to filter observation points of the station with larger influence on the model based on the Cook distance, i.e., delete the outliers.

Furthermore, the Cook distance may measure whether a given regression model is only affected by a single variable. The Cook distance calculates the influence of each data point on the prediction result. For a station observation point i corresponding to any irradiance in the irradiance data after filtering the irradiance abnormality points, the Cook distance will measure changes of a fitting value of the actual power generation capacity when i is included or i is not included, so as to obtain the influence of the station observation point on a fitting result.

A calculation formula of the Cook distance $D_i$ is as follows:

$$D_i = \frac{\sum_{j=1}^{n}(\hat{Y}_j - \hat{Y}_{j(i)})^2}{p \times MSE}. \quad (1)$$

In the formula, n represents a total number of station observation points, which is a number of the irradiance data after filtering the irradiance abnormality points, $\hat{Y}_j$ represents a fitting value of a $j^{th}$ actual power generation capacity y calculated according to the situation of including all the station observation points, $\hat{Y}_{(j)i}$ represents a fitting value of a $j^{th}$ actual power generation capacity y calculated according to the situation of including all the station observation points except the station observation point i, p represents a coefficient number of the preset neural network, and MSE represents a mean square error.

Further, if the Cook distance of a certain station observation point is 4 times greater than an average distance, the station observation point is an outlier, and irradiance data corresponding to the outlier is deleted, and the filtered average daily irradiance data is generated.

At step S2012, determining a photovoltaic station correction coefficient based on the filtered average daily irradiance data and the battery temperature data.

Specifically, the photovoltaic station correction coefficient is generated by using a linear regression method based on the filtered average daily irradiance data and the battery temperature data.

Further, an installed capacity, the average daily irradiance data and the battery temperature in daily data are input into the preset neural network and the daily power generation capacity is taken as a target value, the photovoltaic station correction coefficient is obtained by linear regression.

Figure 5:
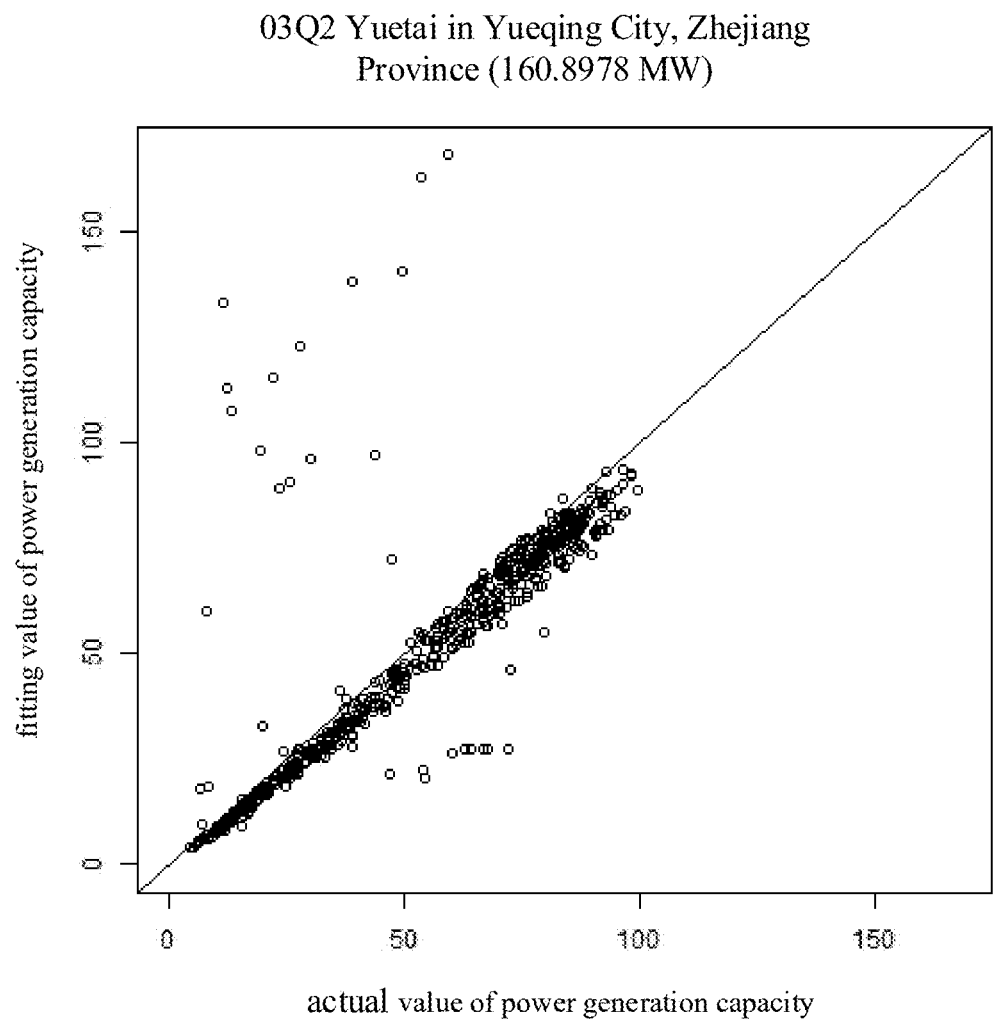
FIG. 5 is a schematic diagram showing a linear regression fitting effect of Yuetai in Yueqing City, Zhejiang Province according to the embodiments of the present disclosure.

For example, as shown in FIG. 5, taking Yuetai (160.8978 MW) in Yueqing City, Zhejiang Province as an example, the photovoltaic station correction coefficient is 0.7701711, and there are 626 pieces of training data, with a total of 127 pieces (20.29%) of training error greater than 20%. It can be seen that except for some outliers, most observations are evenly distributed around 45° line (that is, fitting value=actual value).

Figure 6:
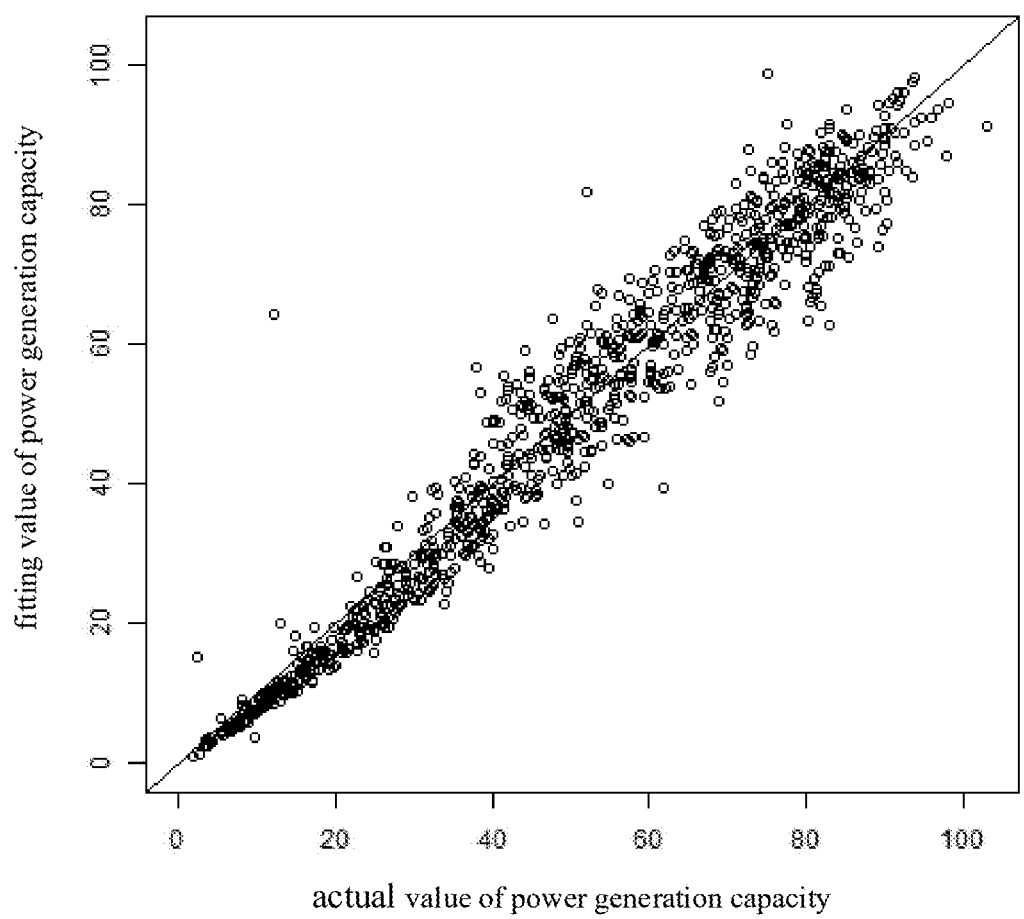
FIG. 6 is a schematic diagram showing a linear regression fitting effect of Xiapan in Huainan City, Anhui Province according to the embodiments of the present disclosure.

For example, as shown in FIG. 6, taking Xiapan (150 MW) in Huainan City, Anhui Province as an example, the photovoltaic station correction coefficient is 0.8881927, and there are 1013 pieces of training data, with a total of 215 pieces (21.22%) of training error greater than 20%.

Figure 7:
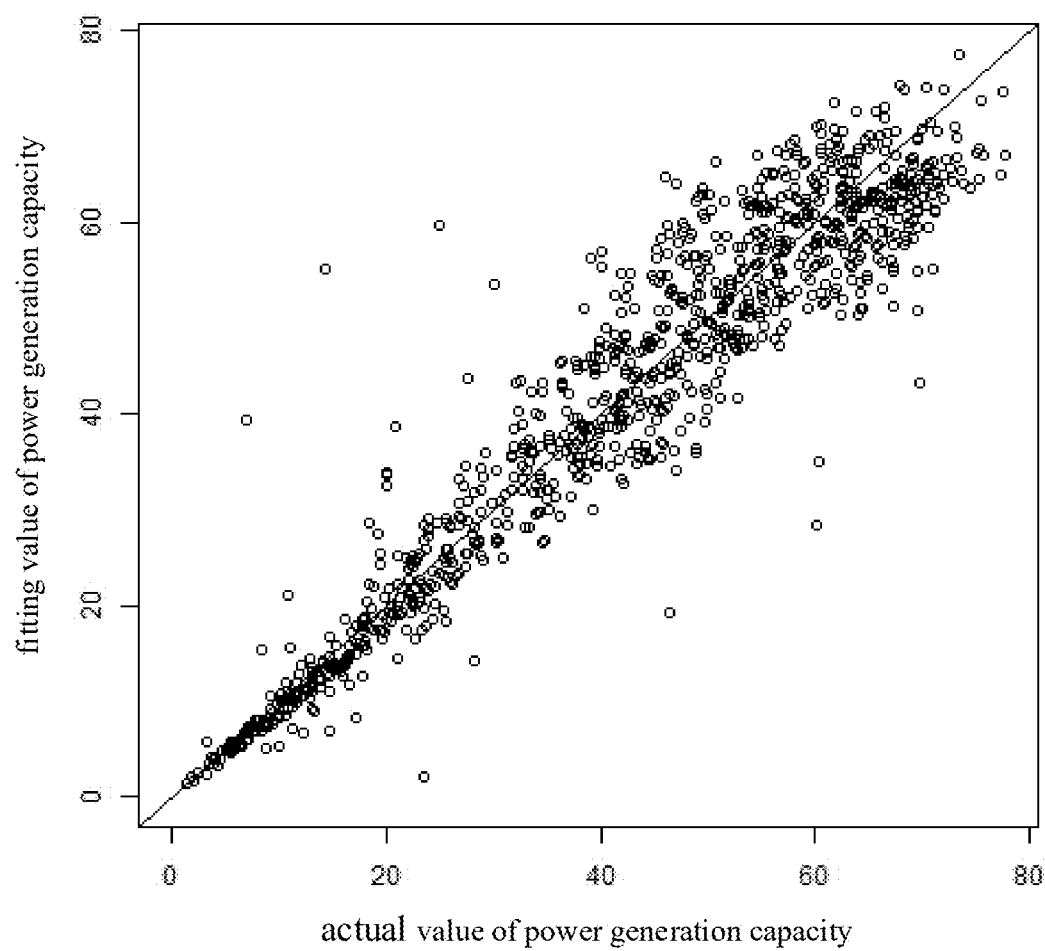
FIG. 7 is a schematic diagram showing a linear regression fitting effect of Jinyu in Weinan City, Shaanxi Province according to the embodiments of the present disclosure.

For example, as shown in FIG. 7, taking Jinyu (100 MW) in Weinan City, Shannxi Province as an example, the photovoltaic station correction coefficient is 0.9825449, and there are 1013 pieces of training data, with a total of 125 pieces (12.34%) of training error greater than 20%.

At step S2013, generating a power temperature correction coefficient by training the preset neural network based on the photovoltaic station correction coefficient and the weather data.

Specifically, the stations with scattered model fitting effects are further investigated. Because the feedback model effects of some stations are greatly affected by the weather, it is considered to train in different weather to optimize a linear model effect. The weather data are divided into sunny, cloudy/overcast/sunny to cloudy, rainy/snowy/cloudy to rainy, and then the power temperature correction coefficients are trained respectively by using the weather data above. Taking Shenglin in Huzhou City, Zhejiang Province for an example, the sunny coefficient is high, the cloudy/overcast coefficient and the rain/snow coefficient are similar, and the model effect (MSE) is improved to some extent. After weather classification, the model effect is shown in the Table 2 below.

TABLE 2

| Model Effect after Weather Classification | | | | |
|---|---|---|---|---|
| Data scope | All data | Sunny | Cloudy/ overcast | Rainy/snowy |
| Power temperature correction coefficient | 0.841526 | 0.88785 | 0.78484 | 0.79188 |

TABLE 2-continued

| Model Effect after Weather Classification | | | | |
|---|---|---|---|---|
| Data scope | All data | Sunny | Cloudy/ overcast | Rainy/snowy |
| Data volume | 296 | 106 | 142 | 42 |
| MSE | 18.36095 | 18.54569 | 16.02396 | 3.070829 |

At step S2014, generating the photovoltaic power generation capacity prediction model based on the filtered average daily irradiance data, the photovoltaic station correction coefficient and the power temperature correction coefficient.

Specifically, an expression of the photovoltaic power generation capacity prediction model is shown as follows:

$$PE_d = k \times P_{predTarg} \times \frac{G_{meas}}{G_{TRC}} \times [1 + \delta(T_C - T_{TRC}) \times 24]. \quad (2)$$

In the expression, $PE_d$ represents the predicted power generation capacity of the photovoltaic station on the current day, k represents the photovoltaic station correction coefficient, $P_{predTarg}$ represents a power generation capacity of a photovoltaic component under a target environmental condition, which is generally a nominal power (kW) under a standard condition, $G_{meas}$ represents unit area irradiance of the photovoltaic component in the same plane, in unit of W/m² (watts/per square meter), $G_{TRC}$ represents average daily irradiance corresponding to the power generation capacity of the photovoltaic component under the target environmental condition, δ (represents the power temperature correction coefficient, $T_C$ represents a measured battery temperature value of the photovoltaic component, and $T_{TRC}$ represents a battery temperature value corresponding to the power generation capacity of the photovoltaic component under the target environmental condition.

According to the abnormality diagnosis method for photovoltaic power generation provided by the embodiment, a data quality of a training set is improved by pre-training the preset machine learning model and filtering the outliers. In addition, considering that the results of the linear regression are sensitive to the outliers and the neural network model is more inclusive to the outliers, this method combines the linear regression with the neural network to improve the accuracy and stability of the model.

At step S202, determining an abnormal photovoltaic station by performing daily power generation capacity fluctuation evaluation and power generation efficiency evaluation on a plurality of photovoltaic stations using the photovoltaic power generation capacity prediction model. Please refer to the step S102 of the embodiment shown in FIG. 1 for details, which will not be repeated here.

At step S203, generating a diagnosis result of the photovoltaic power generation abnormality by comparing the operation data corresponding to the abnormal photovoltaic station with an abnormality condition. Please refer to the step S103 of the embodiment shown in FIG. 1 for details, and will not be repeated here.

According to the abnormality diagnosis method for photovoltaic power generation provided by the embodiment, by filtering the average daily irradiance data and determining the photovoltaic station correction coefficient and the power temperature correction coefficient, the generating of the photovoltaic power generation capacity prediction model is more accurate, and the accuracy of the photovoltaic power generation capacity prediction value is improved.

Figure 8:
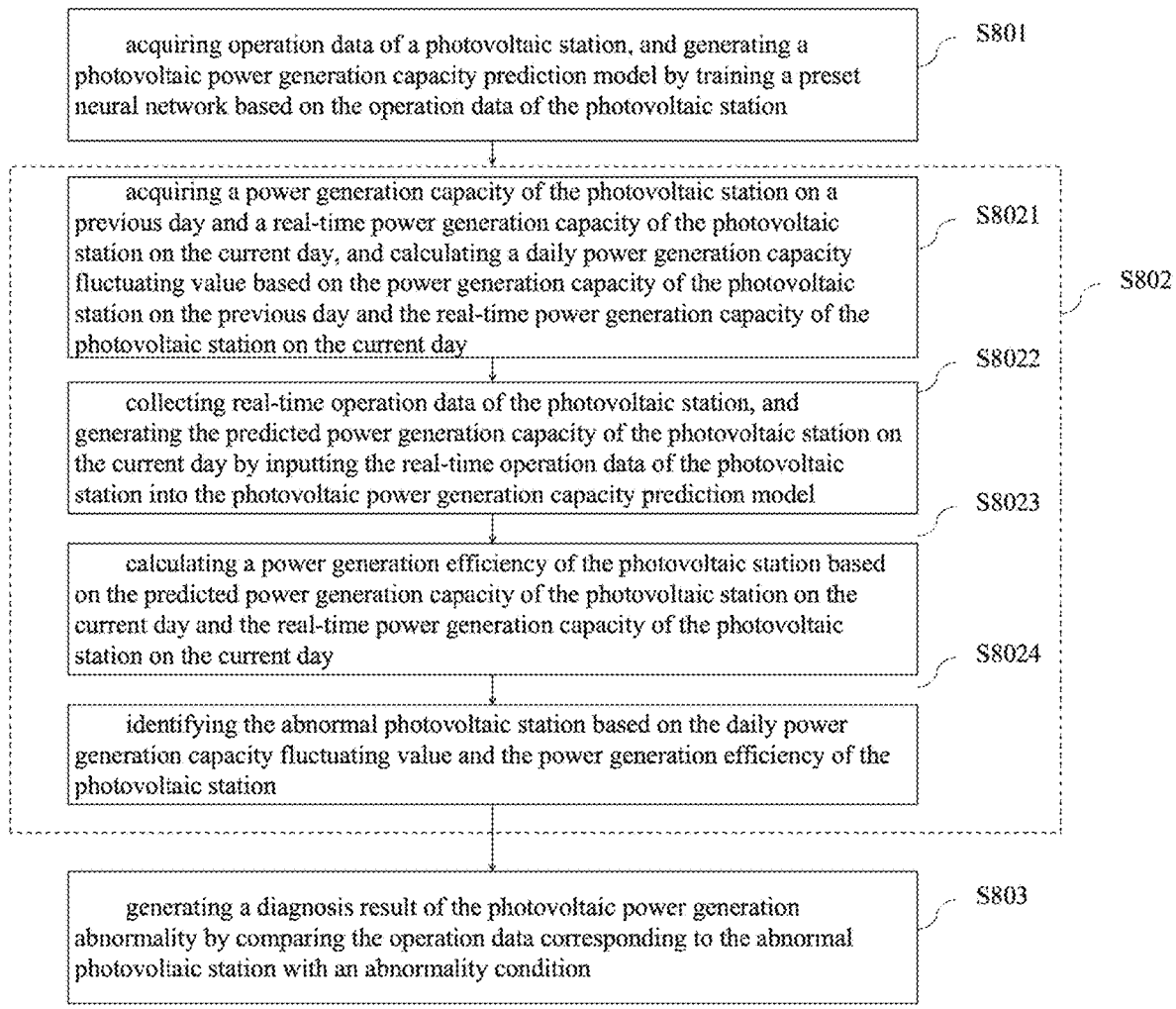
FIG. 8 is a flow chart of another abnormality diagnosis method for photovoltaic power generation according to the embodiments of the present disclosure.

In the embodiment, an abnormality diagnosis method for photovoltaic power generation is provided, which may be used for the above-mentioned mobile terminals, such as mobile phones, tablet computers, etc. FIG. 8 is a flow chart of the abnormality diagnosis method for photovoltaic power generation according to the embodiments of the present disclosure. As shown in FIG. 8, the flow chart includes the following steps.

At step S801, acquiring operation data of a photovoltaic station, and generating a photovoltaic power generation capacity prediction model by training a preset neural network based on the operation data of the photovoltaic station. Please refer to the step S201 of the embodiment shown in FIG. 2 for details, and will not be repeated here.

At step S802, determining an abnormal photovoltaic station by performing daily power generation capacity fluctuation evaluation and power generation efficiency evaluation on a plurality of photovoltaic stations using the photovoltaic power generation capacity prediction model.

Specifically, the step S802 above includes:

Step S8021: acquiring a power generation capacity of the photovoltaic station on a previous day and a real-time power generation capacity of the photovoltaic station on the current day, and calculating a daily power generation capacity fluctuating value based on the power generation capacity of the photovoltaic station on the previous day and the real-time power generation capacity of the photovoltaic station on the current day.

Specifically, the daily power generation capacity fluctuation is used for identifying the stations with significantly dropped daily power generation capacity, and is an index to evaluate a change of the power generation capacity on the current day compared with the power generation capacity on the previous day; wherein a calculation formula of the daily power generation capacity fluctuating value is shown as follows:

$$PF_d = \frac{E_d - E_{d-1}}{E_{d-1}} \times 100\%. \quad (3)$$

In the formula, $PF_d$ represents a day-on-day ratio value of a certain daily power generation capacity of the station on a certain day, i.e., the daily power generation capacity fluctuating value, $E_d$ represents the real-time power generation capacity of the photovoltaic station on the current day, in unit of ten thousand kW·h (ten thousand kilowatts per hour), and $E_{d-1}$ represents the power generation capacity of the station on the previous day, in unit of ten thousand kW·h.

At step S8022, collecting real-time operation data of the photovoltaic station, and generating the predicted power generation capacity of the photovoltaic station on the current day by inputting the real-time operation data of the photovoltaic station into the photovoltaic power generation capacity prediction model.

At step S8023, calculating a power generation efficiency of the photovoltaic station based on the predicted power generation capacity of the photovoltaic station on the current day and the real-time power generation capacity of the photovoltaic station on the current day.

Specifically, the power generation efficiency of the photovoltaic station refers to a difference between the power generation capacity on the evaluation day and the theoretical power generation capacity on the evaluation day, i.e., the predicted daily power generation capacity based on machine learning; wherein a calculation formula of the power generation efficiency of the photovoltaic station is shown as follows:

$$PR_d = \frac{E_d - PE_d}{E_d} \times 100\%. \quad (4)$$

In the formula above, $PR_d$ represents a difference percentage between a daily power generation capacity of the station on a certain day and a theoretical power generation capacity, i.e., the power generation efficiency of the photovoltaic station, and $PE_d$ represents the predicted power generation capacity of the photovoltaic station on the current day, in unit of ten thousand kW·h.

At step S8024, identifying the abnormal photovoltaic station based on the daily power generation capacity fluctuating value and the power generation efficiency of the photovoltaic station.

Specifically, the daily power generation capacity fluctuating value and the power generation efficiency of the photovoltaic station are respectively compared with a preset power generation threshold. When the daily power generation capacity fluctuating value and the power generation efficiency of the photovoltaic station are greater than the preset threshold, an evaluation result is that the power generation efficiency is low and the daily power generation capacity decreases obviously, and then a scene corresponding to the daily power generation capacity fluctuating value and the power generation efficiency of the photovoltaic station is further diagnosed.

At step S803, generating a diagnosis result of the photovoltaic power generation abnormality by comparing the operation data corresponding to the abnormal photovoltaic station with an abnormality condition. Please refer to the step S203 of the embodiment shown in FIG. 2 for details, which will not be repeated here.

According to the abnormality diagnosis method for photovoltaic power generation provided by the embodiment, by calculating the daily power generation capacity fluctuating value and the power generation efficiency of the photovoltaic station, the power generation efficiency and the daily power generation capacity of each photovoltaic station can be known timely, the station with low power generation efficiency and obvious reduction of power generation capacity can be identified timely, the list of stations that need to be focused on every day is identified timely from an overall aspect, and key objects of concern are oriented.

Figure 9:
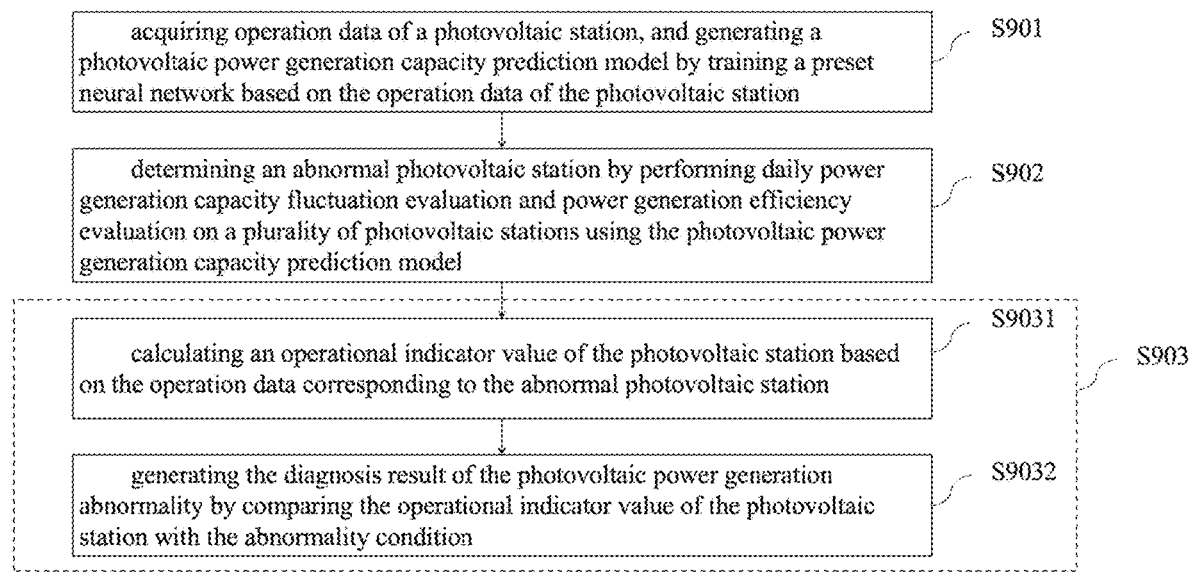
FIG. 9 is a flow chart of yet another according to the embodiments of the present disclosure.

In the embodiment, an abnormality diagnosis method for photovoltaic power generation is provided, which may be used for the above-mentioned mobile terminals, such as mobile phones, tablet computers, etc. FIG. 9 is a flow chart of the abnormality diagnosis method for photovoltaic power generation according to the embodiments of the present disclosure. As shown in FIG. 9, the flow chart includes the following steps.

At step S901, acquiring operation data of a photovoltaic station, and generating a photovoltaic power generation capacity prediction model by training a preset neural network based on the operation data of the photovoltaic station. Please refer to the step S801 of the embodiment shown in FIG. 8 for details, which will not be repeated here.

At step S902, determining an abnormal photovoltaic station by performing daily power generation capacity fluctuation evaluation and power generation efficiency evaluation on a plurality of photovoltaic stations using the photovoltaic power generation capacity prediction model. Please refer to the step S802 of the embodiment shown in FIG. 8 for details, which will not be repeated here.

At step S903, generating a diagnosis result of the photovoltaic power generation abnormality by comparing the operation data corresponding to the abnormal photovoltaic station with an abnormality condition.

Specifically, the step S903 above includes:

Step S9031: calculating an operational indicator value of the photovoltaic station based on the operation data corresponding to the abnormal photovoltaic station.

In some optional embodiments, the operational indicator value of the photovoltaic station includes a resource change value, a power loss value, an inverter operation state statistical value, an inverter output power dispersion ratio, a photovoltaic array efficiency, a photovoltaic array efficiency, an inverter loss value and an inverter outage situation. The step S9031 above includes the following steps.

At step b1, determining average daily irradiance of the abnormal photovoltaic station on the current day and average daily irradiance of the abnormal photovoltaic station on the previous day based on the operation data corresponding to the abnormal photovoltaic station, and calculating a day-on-day change rate of resources based on the average daily irradiance on the current day and the average daily irradiance on the previous day.

Specifically, the photovoltaic power generation is closely related to a resource situation. In view of the obvious reduction of daily power generation capacity, it is determined from the resource change situation whether the obvious reduction of daily power generation capacity is directly related to the resource change; wherein, a calculation formula of the resource change value is shown as follows:

$$PG_d = \frac{G_d - G_{d-1}}{G_{d-1}}. \tag{5}$$

In the formula, $PG_d$ represents the resource change value, i.e., a day-on-day ratio value of the resource fluctuation on the current day, $G_d$ represents the average daily irradiance on the current day, and $G_{d-1}$ represents the average daily irradiance on the previous day; in the case that $PG_d$ is less than 0, it is represented that the resource on the current day is reduced than the resource on the previous day, and the smaller the resource change value is, the more obvious the resource reduction is.

Further, the resource change value is calculated by station with day as dimension.

At step b2, determining a power loss of each device based on the operation data corresponding to the abnormal photovoltaic station, and calculating a power loss value based on the power loss of each device.

Specifically, the power loss is divided into four types, which are power restriction, accompanying shutdown, overhaul and failure. The fluctuation of the daily power generation capacity fluctuation or the low power generation efficiency may be related to the power loss.

At step b3, determining a number of station inverters and unit state data of the station inverters based on the operation data corresponding to the abnormal photovoltaic station, and calculating the inverter operation state statistical value based on the number of station inverters and the unit state data of the station inverters.

Specifically, the inverter operation state includes normal operation, power-restricted operation, warmed operation, normal shutdown, shutdown due to failure, shutdown due to power restriction, shutdown due to external factors and abnormal communication. Counting operation duration in each state can reflect the overall operation situation, wherein a calculation formula of the inverter operation state statistical value is as follows:

$$P_u = \frac{\sum_{h=1}^{m} \sum_{t=1}^{8*60} A_{uht}}{m*8*60}. \tag{6}$$

Wherein, u represents eight operation states of the inverter, u=1, 2, ..., 8, $P_u$ represents a proportion of the unit on the current day in the inverter operation state u, m presents the number of station inverters, and $A_{uht}$ represents a unit state of the station inverter h at a moment t, wherein a formula for determining a value of $A_{uht}$ is shown as follows:

$$A_{uht} = \begin{cases} 1, & \text{if the inverter } h \text{ is in the state } u \text{ at the moment } t \\ 0, & \text{if the inverter } h \text{ is not in the state } u \text{ at the moment } t \end{cases} \tag{7}$$

Further, the inverter operation state statistical value is counted by station with day as dimension, and time periods for counting range from 9:00 to 17:00.

At step b4, determining station inverter output powers based on the operation data corresponding to the abnormal photovoltaic station, and calculating an inverter output power dispersion ratio based on the station inverter output powers and the number of station inverters.

Specifically, the inverter output power dispersion ratio reflects a dispersion degree of the inverter output power at a certain moment. The smaller the dispersion ratio, the more concentrated the inverter alternating current power curves, the more consistent and stable the overall operation of inverters. When the dispersion ratio is high, it indicates the existence of inverters with low power generation efficiency.

Further, a standard deviation and an average value of the station inverter output powers are determined based on the station inverter output powers and the number of station inverters, and the inverter output power dispersion ratio is calculated based on the standard deviation and the average value of the station inverter output powers.

Further, calculation formulas of the standard deviation and the average value of the station inverter output powers are shown as follows:

$$\sigma = \sqrt{\frac{1}{m} \sum_{h=1}^{m} (P_{ach} - \mu)^2} \tag{8}$$

and $$\mu = \frac{1}{m} \sum_{h=1}^{m} P_{ach}. \tag{9}$$

In the formulas, σ represents the standard deviation of the station inverter output powers, µ represents the average value of the station inverter output powers, and $P_{ach}$ represents the output power of the inverter h.

Further, a calculation formula of the inverter output power dispersion ratio $CV_{P_{ac}}$ is shown as follows:

$$CV_{P_{ac}} = \frac{\sigma}{\mu}. \qquad (10)$$

Further, time periods for counting range from 9:00 to 17:00 by station, counting is performed every half hour, and the inverter output power dispersion ratio is calculated 16 times a day.

At step b5, determining an input power quantity of the station inverter, a photovoltaic array effective area and a total radiation quantity of an inclined plane based on the operation data corresponding to the abnormal photovoltaic station, and calculating a photovoltaic array efficiency based on the input power quantity of the station inverter, the photovoltaic array effective area and the total radiation quantity of the inclined plane.

Specifically, the photovoltaic array efficiency represents a photovoltaic array energy conversion efficiency, that is, a ratio of the energy output by the photovoltaic array to the inverter (the input power quantity of the inverter) to the energy incident on the photovoltaic array (the total radiation quantity of the inclined plane calculated according to the photovoltaic array effective area). The photovoltaic array efficiency represents an ability of the photovoltaic array to convert energy. The higher the value, the stronger the ability of the photovoltaic array to convert energy. The change of the photovoltaic array efficiency can reflect whether a photovoltaic panel is shielded or covered.

A calculation formula of the photovoltaic array efficiency $\eta_A$ is shown as follows:

$$\eta_A = \frac{E_{DC}}{A \times H_T} \times 100\%. \qquad (11)$$

In the formula, $E_{DC}$ represents the input power quantity of the station inverter, in unit of kW·h, A represents the photovoltaic array effective area, in unit of m², $H_T$ represents the total radiation quantity of the inclined plane, in unit of kW-h/m² (or MJ/m², megajoule per square meter).

At step b6, determining an inverter direct current side power and an inverter alternating current side power based on the operation data corresponding to the abnormal photovoltaic station, and calculating an inverter loss value based on the inverter direct current side power and the inverter alternating current side power.

Specifically, the inverter loss refers to the loss in the process of the inverter in the process of converting from direct current to alternating current. The inverter loss value includes a real-time loss rate of the inverter and an average loss rate of the inverter on a certain day. A calculation formula of the real-time loss rate of the inverter is as follows:

$$\delta_{h,t} = \left(1 - \frac{P_{ho,t}}{P_{hh,t}}\right) \times 100\%. \qquad (12)$$

In the formula, $\delta_{h,t}$ represents a real-time loss efficiency of the inverter h at the moment t, dimensionless (%), $P_{ho,t}$ represents the alternating current side power of the inverter h at the moment t, in unit of kW, and $P_{hh,t}$ represents the direct current side power of the inverter h at the moment t, in unit of kW.

Further, according to an inverter level, the real-time loss rate of the inverter is counted at a fixed frequency every day, and time periods for counting range from 9:00 to 17:00.

Further, a calculation formula of an average loss rate of the inverter on a certain day is as follows:

$$\delta_c = \left(1 - \frac{E_{ho}}{E_{hh}}\right) \times 100\%. \qquad (13)$$

In the formula, $\delta_c$ represents the average loss rate of the inverter in the time period of one day, dimensionless (%), $E_{ho}$ represents the inverter alternating current side power in the time period of one day, in unit of kilowatt hour (kW·h), and $E_{hh}$ represents the inverter alternating current side power in the time period of one day, in unit of kilowatt hour (kW·h).

Further, a calculation formula of $E_{ho}$ is shown as follows:

$$E_{ho} = \sum_{h=1}^{m} P_{ho,t_a}|t_a|. \qquad (14)$$

In the formula, $P_{ho,t_a}$ represents an alternating current side power of the inverter h at a moment $t_a$.

Further, a calculation formula of $E_{hh}$ is shown as follows:

$$E_{hh} = \sum_{h=1}^{m} P_{hh,t_a}|t_a|. \qquad (15)$$

In the formula, $P_{hh,t_a}$ represents a direct current side power of the inverter h at a moment $t_a$.

Further, according to the inverter level, the inverter loss value is calculated with day as dimension, and time periods for counting range from 9:00 to 17:00.

At step b7, determining a daily power generation capacity of the station inverter based on the operation data corresponding to the abnormal photovoltaic station, and determining an inverter outage situation based on the daily power generation capacity of the station inverter.

Specifically, the inverter outage situation refers to analyzing the daily power generation capacity of the inverter, and reflecting whether the inverter is in normal power generation state from the daily power generation capacity. The data information involved in the inverter outage situation statistics is daily cumulative power generation capacity of each inverter in the centralized control system. If the daily power generation capacity of a certain inverter is obviously less than that of other inverters, it can be preliminarily determined that the inverter is not in normal power generation state on the current day. The statistical dimension and frequency of the inverter are based on inverter level with daily as dimension.

Further, according to the calculated operational indicator value of the photovoltaic station, a category of the photovoltaic station corresponding to the calculated operational indicator value of the photovoltaic station is determined, i.e., two categories which are suggested for concern and power generation capacity increased significantly. The specific target categories of concern are shown in Table 3 below.

TABLE 3

Target Category Table

| Category | Definition | Calculation formula |
| --- | --- | --- |
| Suggested for concern | The day-on-day ratio of the power generation capacity of the photovoltaic station in the statistical period is less than or equal to −20% or a difference proportion of the predicted power generation capacity is less than or equal to −20%. | The power generation capacity is obviously lower than the daily power generation capacity on the previous day: the day-on-day ratio of the power generation capacity = (the power generation capacity on the current day − the power generation capacity on the previous day)/the power generation capacity on the previous day *100% (less than or equal to −20%)<br>The power generation capacity is obviously lower than the predicted power generation capacity: the difference proportion of the predicted power generation capacity = (amended power generation capacity − predicted power generation capacity)/predicted power generation capacity * 100% (less than or equal to −20%) |
| Power generation capacity increased significantly | The day-on-day ratio of the power generation capacity of the photovoltaic station in the statistical period is greater than or equal to 20%. | The power generation capacity is obviously higher than the daily power generation capacity on the previous day: the day-on-day ratio of the power generation capacity = (the power generation capacity on the current day − the power generation capacity on the previous day)/the power generation capacity on the previous day *100% (greater than or equal to 20%) |

Further, for the photovoltaic stations that belong to the category of suggested for concern, it is focused to explain the reasons for the significant reduction of the power generation capacity or the low power generation efficiency. For the photovoltaic stations that belong to the category of power generation capacity increased significantly, it is focused to explain the reasons for the significant increase of the day-on-day ratio of the power generation capacity.

At step S9032, generating the diagnosis result of the photovoltaic power generation abnormality by comparing the operational indicator value of the photovoltaic station with the abnormality condition.

In some optional embodiments, the step S9032 above includes:

Step c1: comparing the resource change value with a preset resource threshold, and determining the diagnosis result of the photovoltaic power generation abnormality being caused by resource fluctuation in the case that the resource change value is greater than the preset resource threshold.

Step c2: determining a power loss due to failure, a power loss due to overhaul, a power loss due to power restriction and a power loss due to accompanying shutdown based on the power loss value.

Step c3: determining a day-on-day ratio of shutdown duration due to failure, a day-on-day ratio of normal shutdown duration, a day-on-day ratio of power-restricted operation and power-restricted shutdown duration and a day-on-day ratio of shutdown duration due to external factors based on the inverter operation state statistical value.

Step c4: in the case that the power loss due to failure is greater than a preset power loss threshold, or the day-on-day ratio of the shutdown duration due to failure is less than a preset shutdown duration threshold, determining the diagnosis result of the photovoltaic power generation abnormality being that the photovoltaic power generation abnormality is caused by failure.

Step c5: in the case that the power loss due to overhaul is less than the preset power loss threshold, or the day-on-day ratio of the normal shutdown duration is less than the preset shutdown duration threshold, determining the diagnosis result of the photovoltaic power generation abnormality being that the photovoltaic power generation abnormality is caused by overhaul.

Step c6: in the case that the power loss due to power restriction is less than the preset power loss threshold, or the day-on-day ratio of the power-restricted operation and power-restricted shutdown duration is less than the preset shutdown duration threshold, determining the diagnosis result of the photovoltaic power generation abnormality being that the photovoltaic power generation abnormality is caused by power restriction.

Step c7: in the case that the power loss due to accompanying shutdown is less than the preset power loss threshold, or the day-on-day ratio of the shutdown duration due to external factors is less than the preset shutdown duration threshold, determining the diagnosis result of the photovoltaic power generation abnormality being that the photovoltaic power generation abnormality is caused by accompanying shutdown.

Specifically, combined with the information of the resources, the power loss and the inverter operation state of the power station, the reasons are initially classified into six categories, as shown in Table 4 below.

TABLE 4

Table of diagnosis result of the photovoltaic power generation abnormality

| Reason | Determining rule |
| --- | --- |
| Resource fluctuation | Suggested for concern: the resources on the current day are lower than the resources on a previous day by −20% and below;<br>Power generation capacity increased significantly: the resources on the current day are more than the resources on the previous day by 20% and more. |

TABLE 4-continued

Table of diagnosis result of the photovoltaic power generation abnormality

| Reason | Determining rule |
|---|---|
| Failure | Suggested for concern: a. the power loss due to failure accounts for 5% or more of the daily power generation capacity or the day-on-day ratio of the power loss due to failure is 5% or more, or b, the shutdown duration due to failure accounts for 5% or more of the daily operation duration or the day-on-day ratio of the shutdown duration due to failure is 5% or more.<br>Power generation capacity increased significantly: the day-on-day ratio of the power loss due to failure is less than −5% and the day-on-day ratio of the shutdown duration due to failure is less than −5%. |
| Overhaul | Suggested for concern: a. the power loss due to overhaul accounts for 5% or more of the daily power generation capacity or the day-on-day ratio of the power loss due to overhaul is 5% or more, or b, the normal shutdown duration accounts for 5% or more of the daily operation duration or the day-on-day ratio of the normal shutdown duration to failure is 5% or more.<br>Power generation capacity increased significantly: the day-on-day ratio of the power loss due to overhaul is less than −5% and the day-on-day ratio of the normal shutdown duration is less than −5%. |
| Power restriction | Suggested for concern: a. the power loss due to power restriction accounts for 5% or more of the daily power generation capacity or the day-on-day ratio of the power loss due to power restriction is 5% or more;<br>or b, the power-restricted operation and power-restricted shutdown duration accounts for 5% or more of the daily operation duration or the day-on-day ratio of the power-restricted operation and power-restricted shutdown duration is 5% or more.<br>Power generation capacity increased significantly: the day-on-day ratio of the power loss due to power restriction is less than −5% or the day-on-day ratio of the power-restricted operation and power-restricted shutdown duration is less than −5%. |
| Accompanying shutdown | Suggested for concern: a. the power loss due to accompanying shutdown accounts for 5% or more of the daily power generation capacity or the day-on-day ratio of the power loss due to accompanying shutdown is 5% or more, or b, the shutdown duration due to external factors accounts for 5% or more of the daily operation duration or the day-on-day ratio of the shutdown duration due to external factors is 5% or more.<br>Power generation capacity increased significantly: the day-on-day ratio of the power loss due to accompanying shutdown is less than −5% or the day-on-day ratio of the shutdown duration due to external factors is less than −5%. |
| Other | Reasons other than "resources, failure, overhaul, power restriction, accompanying shutdown" and the like. |

According to the abnormality diagnosis method for photovoltaic power generation provided by the embodiment, combined with the operational indicator value of the photovoltaic station, the reasons for low power generation efficiency and obvious reduction of power generation capacity are initially found out, business departments are supported to establish a mechanism of "finding problems, feeding back problems and rectifying problems" in management, and the operating efficiency of photovoltaic power generation is entirely improved. Moreover, based on the operational indicator value of the photovoltaic station such as the inverter operation state, the output power dispersion ratio, the loss situation and the outage situation, the specific reasons for the day-on-day ratio decrease of the power generation capacity of the photovoltaic station or significantly lower than the predicted value are further diagnosed.

The following describes the abnormal diagnosis for photovoltaic power generation through specific embodiments.

Embodiment 1

Specific steps of training a photovoltaic power generation capacity prediction model are as follows.

Aiming at a station where centralized control data of the Three Gorges Renewables has been accessed, real-time irradiance and a daily reported maximum temperature in the centralized control data are substituted into a formula, a real-time active power is taken as a target value, and a regression coefficient is obtained by linear regression.

According to a power generation capacity supervision report of the Three Gorges Renewables and actual access data, centralized control data of Jinyu (100 MW) in Weinan City, Shaanxi Province in October were selected as pilot data, dates with no power loss were selected, and by using one piece of processed data generated every 10 minutes (144 pieces per day), a model coefficient was calculated to be 0.977104, which was not much different from a daily reported coefficient of 1.0195779 of the station.

First verification of experimental results: on October 13, the coefficient was 0.977104, and when a centralized control daily power generation capacity on the current day was 102,852.3167 kWh and a predicted power generation capacity of the model was 96,540.6812 kWh, a difference between the predicted power generation capacity and the actual power generation capacity was small, and a predicted active power was consistent with an actual active power in trend as a whole.

Second verification of experimental results: on October 22, the coefficient was 0.977104, and when the centralized control daily power generation capacity on the current day was 325,503.85 kWh and the predicted power generation capacity of the model was 509,546.0857 kWh, the difference between the predicted power generation capacity and the actual power generation capacity was large, and in a time period when the predicted power deviated greatly from the actual power, some units were in a shutdown state.

Then, the regression coefficients obtained above were used to train a preset neural network. For example, centralized control data of Shiliyuan Station (100.00 MW) in Chunhua County, Shaanxi Province in September, October and November were trained and tested with day+night data, and 6,553 training data sets and 1,366 testing data sets were determined in proportion, and then the preset neural network was trained with the above training data sets and testing data sets to generate the photovoltaic power generation capacity prediction model.

Embodiment 2

Taking Guazhou County, Gansu Province as an example, in an abnormal diagnosis process of photovoltaic power generation, a daily power generation capacity of the station was sequentially increased by 5.93% compared with a daily power generation capacity on a previous day, which was −25.03% lower than a predicted power generation capacity value. Therefore, it was preliminarily determined that power generation efficiency on the current day was low, resources on the current day were sequentially increased day-on-day by 50.25% compared with resources on the previous day, while a day-on-day increase range of the power generation capacity failed to reach this level.

Four types of power losses in a daily power production report on the current day were all 0. In combination with an operation state of an inverter, normal shutdown duration and shutdown duration caused by external factors were obviously increased compared with the duration on the previous day. Therefore, it was preliminarily determined that the reason for the low power generation efficiency on the current day was that: there were abnormal overhaul and abnormal accompanying shutdown.

Operation duration of the inverter (in unit of minute) was as shown in Table 5 below.

TABLE 5

| | Operation Duration of Inverter (in Unit of Minute) | | | | | | | |
|---|---|---|---|---|---|---|---|---|
| | Communication abnormality | Normal operation | Warned operation | Power-restricted operation | Normal shutdown | Shutdown due to failure | Power-restricted shutdown | Shutdown due to external factors |
| Current day | 2540 | 51050 | 17060 | 3210 | 67250 | 600 | 0 | 530 |
| Previous day | 0 | 54500 | 26270 | 16770 | 26200 | 720 | 0 | 200 |

Upon calculation, all the inverters were basically maintained at a normal level (DC-to-AC loss≤4%), but loss rates of Top 10 were all higher than an average value of the station. According to the last Top 10 in a daily power generation capacity rank list of the inverters, it can be found that daily cumulative power generation capacities of two inverters (#053 and #701) were obviously smaller than those of other inverters, and daily cumulative power generation capacities of the remaining inverters were slightly lower than the average value of the station. The inverters in the whole station have a low dispersion ratio, and a consistent output situation.

Embodiment 3

Taking Shuanggu in Zhongxian County, Chongqing City as an example, in an abnormal diagnosis process of photovoltaic power generation, a daily power generation capacity of the station was sequentially increased by 500.81% compared with a daily power generation capacity on a previous day, which was −22.42% lower than a predicted power generation capacity value. Therefore, it was preliminarily determined that power generation efficiency on the current day was low, resources on the current day were sequentially increased day-on-day by 748.39% compared with resources on the previous day, while a day-on-day increase range of the power generation capacity failed to reach this level.

A submitted failure loss in a daily power production report on the current day was 10 kW·h. In combination with an operation state of an inverter, a normal shutdown state last for a long time. Therefore, it was preliminarily determined that the reason for the low power generation efficiency on the current day was: overhaul.

Operation duration of the inverter (in unit of minute) was as shown in Table 6 below.

TABLE 6

Operation Duration of Inverter (in Unit of Minute)

| | Communication abnormality | Normal operation | Warned operation | Power-restricted operation | Normal shutdown | Shutdown due to failure | Power-restricted shutdown | Shutdown due to external factors |
|---|---|---|---|---|---|---|---|---|
| Current day | 2920 | 103580 | 0 | 0 | 88100 | 0 | 0 | 0 |
| Previous day | 3230 | 101010 | 0 | 0 | 91760 | 0 | 0 | 0 |

Upon calculation, all the inverters were basically maintained at a normal level (DC-to-AC loss<3%), but the loss of the current day was slightly higher than that of the previous day. According to the last Top 10 in a daily power generation capacity rank list of the inverters, it can be found that daily power generation capacities of the inverters were all higher than those of the inverters on the previous day, but a power generation capacity of an inverter unit 1883 was significantly lower than those of other inverters. Dispersion ratios of the inverters in the whole station were all at a high level from 13:30 to 17:00, and some inverters had a low output situation.

Embodiment 4

Taking Ningsheng in Zhaoyuan County, Heilongjiang Province as an example, in an abnormal diagnosis process of photovoltaic power generation, a daily power generation capacity of the station was decreased day-on-day by −47.22% compared with a daily power generation capacity of the station on a previous day, and a difference with a predicted power generation capacity value was not greater than −1.44%. Therefore, it was determined that the power generation capacity on the current day was significantly decreased. Resources on the current day are decreased day-on-day by −47.22% compared with resources on the previous day, which was similar to a day-on-day decrease ratio of the power generation capacity on the current day, and conforms to a positive correlation relation described in a physical model. Four types of power losses in a daily power production report on the current day were all 0. In combination with an operation state of an inverter, a shutdown state caused by external factors last for a long time, and in addition, normal shutdown duration was increased compared with normal shutdown duration on the previous day. Therefore, it was preliminarily determined that the reasons for the low power generation efficiency on the current day were: resource fluctuation, accompanying shutdown and overhaul.

Operation duration of the inverter (in unit of minute) was as shown in Table 7 below.

Upon calculation, all the inverters were basically maintained at a normal level (DC-to-AC loss<3%), but the loss of the current day was slightly lower than that of the previous day. According to the last Top 10 in a daily power generation capacity rank list of the inverters, it can be found that daily power generation capacities of the inverters were all lower than those of the inverters on the previous day, but daily power generation capacities of various inverters were approximate. Dispersion ratios of the inverters in the whole station were slightly increased on 11:00, whole-day dispersion ratios were less than 20%, and output situations of the inverters were relatively consistent.

Embodiment 5

Taking Fuxian in Shuangliao City, Jilin Province as an example, in an abnormal diagnosis process of photovoltaic power generation, a daily power generation capacity of the station was increased day-on-day by 68.43% compared with a daily power generation capacity of the station on a previous day, and a difference between a corrected power generation capacity and a predicted value was not greater than −2.56%. Therefore, it was determined that the power generation capacity on the current day was significantly increased. Resources on the current day were increased day-on-day by 69.5% compared with resources on the previous day, which was similar to a day-on-day increase ratio of the power generation capacity on the current day, and conforms to a positive correlation relation described in a physical model. A recorded power-restricted loss in a daily power production report on the current day was 80,000 kW·h. In combination with an operation state of an inverter, normal shutdown duration and failure shutdown duration on the current day were decreased. Therefore, it was preliminarily determined that the reasons for the significant increase of the power generation capacity were: resource fluctuation, and reduced failure and overhaul duration.

Operation duration of the inverter (in unit of minute) was as shown in Table 8 below.

TABLE 7

Operation Duration of Inverter (in Unit of Minute)

| | Communication abnormality | Normal operation | Warned operation | Power-restricted operation | Normal shutdown | Shutdown due to failure | Power-restricted shutdown | Shutdown due to external factors |
|---|---|---|---|---|---|---|---|---|
| Current day | 440 | 23180 | 0 | 0 | 290 | 0 | 0 | 17790 |
| Previous day | 450 | 22910 | 150 | 0 | 230 | 0 | 0 | 18260 |

TABLE 8

| | Operation Duration of Inverter (in Unit of Minute) | | | | | | | |
|---|---|---|---|---|---|---|---|---|
| | Communication abnormality | Normal operation | Warned operation | Power-restricted operation | Normal shutdown | Shutdown due to failure | Power-restricted shutdown | Shutdown due to external factors |
| Current day | 39560 | 206590 | 5160 | 130 | 169450 | 80 | 1370 | 20 |
| Previous day | 55610 | 180250 | 4460 | 10 | 187040 | 110 | 1360 | 0 |

In the above embodiments, rules were found by the linear regression based on the physical model of photovoltaic power generation and by the neural network based on data learning. The linear regression did not have a high requirement for training data. The neural network required sufficient samples to achieve the best training effect. The linear regression was sensitive to outliers, which will directly affect a change of coefficients. The neural network was more tolerant to the outliers, and a small number of outliers will not affect the training effect. If daily reported data were used for training, the linear regression was more suitable than the neural network because a number of samples is limited (one piece of data per day); if the centralized control data could be used (data stability needed to be guaranteed), the neural network and the linear regression may be used at the same time. Moreover, by using data information such as an irradiance resource, a temperature and a weather collected by a big data platform, a list of stations that needed to be focused on every day was identified as a whole by photovoltaic power generation capacity evaluation, and key objects focused were oriented. Data mining was carried out for the operation data of the station, and specific reasons for the day-on-day decrease of the power generation capacity of the station or the situation that the power generation capacity of the station was significantly lower than the predicted value were further diagnosed from operational indicators such as an inverter operation state, an output power dispersion ratio, a loss situation and an outage situation.

In the embodiment, there is also provided an abnormality diagnosis apparatus for photovoltaic power generation. The apparatus is used for implementing the foregoing embodiments and the preferred implementation manners, and those which have been described will not be elaborated again. As used below, the term "module" can implement a combination of software and/or hardware with a predetermined function. Although the apparatus described in the following embodiment is preferably implemented by means of software, the implementation of hardware or a combination of software and hardware is also possible and conceived.

Figure 10:
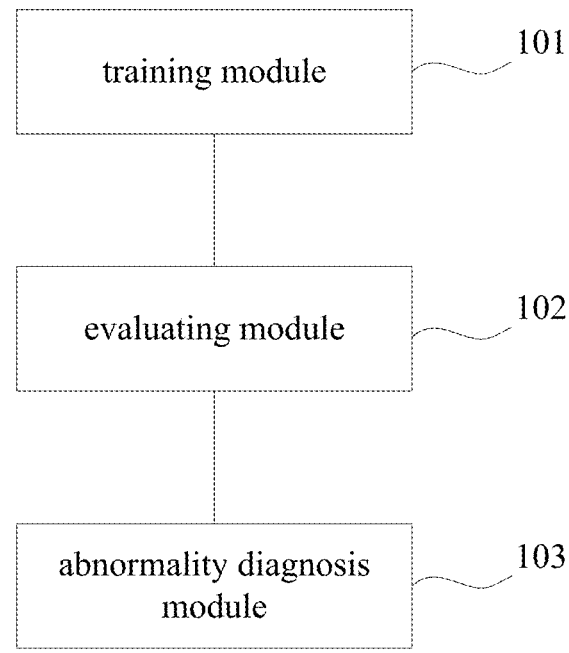
FIG. 10 is a structural block diagram of an abnormality diagnosis apparatus for photovoltaic power generation according to the embodiments of the present disclosure.

The embodiment provides an abnormality diagnosis apparatus for photovoltaic power generation, as shown in FIG. 10, including:
a training module 101 configured for acquiring operation data of a photovoltaic station, generating a photovoltaic power generation capacity prediction model by training a preset neural network based on the operation data of the photovoltaic station;
an evaluating module 102 configured for using a photovoltaic power generation capacity prediction result to perform daily power generation capacity fluctuation evaluation and power generation efficiency evaluation on a plurality of photovoltaic stations, and determining an abnormal photovoltaic station; and
an abnormality diagnosis module 103 configured for generating a diagnosis result of the photovoltaic power generation abnormality by comparing the operation data corresponding to the abnormal photovoltaic station with an abnormality condition.

In some optional embodiments, the training module 101 includes:
a filtering unit configured for generating filtered average daily irradiance data by filtering the average daily irradiance data;
a determining unit configured for determining a photovoltaic station correction coefficient based on the filtered average daily irradiance data and battery temperature data;
a training unit configured for generating a power temperature correction coefficient by training the preset neural network based on the photovoltaic station correction coefficient and the weather data; and
a first generating unit configured for generating the photovoltaic power generation capacity prediction model based on the filtered average daily irradiance data, the photovoltaic station correction coefficient and the power temperature correction coefficient.

In some optional embodiments, the filtering unit includes:
a first determining subunit configured for acquiring power generation capacity data corresponding to the average daily irradiance data, and determining a daily power generation capacity of the station and average daily irradiance of the station by filtering the average daily irradiance data and the power generation capacity data greater than preset thresholds;
an identifying subunit configured for identifying irradiance abnormality points based on the daily power generation capacity of the station and the average daily irradiance of the station, and filtering the irradiance abnormality points;
a pre-training subunit configured for generating a pre-training result by pre-training the preset neural network based on the irradiance data after filtering the irradiance abnormality points; and
a deleting subunit configured for, determining outliers of the irradiance data after filtering the irradiance abnormality points based on the pre-training result, and generating the filtered average daily irradiance data by deleting the outliers.

In some optional embodiments, the identifying subunit is specifically configured for generating irradiance in each power generation capacity interval by dividing the daily power generation capacity of the station into a plurality of power generation capacity intervals and mapping the average daily irradiance of the station to the plurality of power generation capacity intervals; and determining a segmented box plot based on the irradiance in each power generation capacity interval, and identifying and filtering the irradiance abnormality points based on the segmented box plot.

In some optional embodiments, the determining unit is specifically configured for generating the photovoltaic station correction coefficient by using a linear regression method based on the filtered average daily irradiance data and the battery temperature data.

In some optional embodiments, in the first generating unit, an expression of the photovoltaic power generation capacity prediction model is shown as follows:

$$PE_d = k \times P_{predTarg} \times \frac{G_{meas}}{G_{TRC}} \times [1 + \delta (T_C - T_{TRC}) \times 24];$$

in the expression, $PE_d$ represents the predicted power generation capacity of the photovoltaic station on the current day, k represents the photovoltaic station correction coefficient, $P_{predTarg}$ represents a power generation capacity of a photovoltaic component under a target environmental condition, $G_{meas}$ represents unit area irradiance of the photovoltaic component in the same plane, $G_{TRC}$ represents average daily irradiance corresponding to the power generation capacity of the photovoltaic component under the target environmental condition, $\delta$ represents the power temperature correction coefficient, $T_C$ represents a measured battery temperature value of the photovoltaic component, and $T_{TRC}$ represents a battery temperature value corresponding to the power generation capacity of the photovoltaic component under the target environmental condition.

In some optional embodiments, the evaluating module 102 includes:
a first calculating unit used for acquiring a power generation capacity of the photovoltaic station on a previous day and a real-time power generation capacity of the photovoltaic station on the current day, and calculating a daily power generation capacity fluctuating value based on the power generation capacity of the photovoltaic station on the previous day and the real-time power generation capacity of the photovoltaic station on the current day;
a second generating unit configured for collecting real-time operation data of the photovoltaic station, and generating the predicted power generation capacity of the photovoltaic station on the current day by inputting the real-time operation data of the photovoltaic station into the photovoltaic power generation capacity prediction model;
a second calculating unit configured for calculating a power generation efficiency of the photovoltaic station based on the predicted power generation capacity of the photovoltaic station on the current day and the real-time power generation capacity of the photovoltaic station on the current day; and
an identifying unit configured for identifying the abnormal photovoltaic station based on the daily power generation capacity fluctuating value and the power generation efficiency of the photovoltaic station.

In some optional embodiments, the abnormality diagnosis module 103 includes:
a third calculating unit configured for calculating an operational indicator value of the photovoltaic station based on the operation data corresponding to the abnormal photovoltaic station; and a comparing unit configured for generating the diagnosis result of the photovoltaic power generation abnormality by comparing the operational indicator value of the photovoltaic station with the abnormality condition.

In some optional embodiments, the third calculating unit includes:
a first calculating subunit configured for determining average daily irradiance of the abnormal photovoltaic station on the current day and average daily irradiance of the abnormal photovoltaic station on the previous day based on the operation data corresponding to the abnormal photovoltaic station, and calculating a resource change value based on the average daily irradiance on the current day and the average daily irradiance on the previous day;
a second calculating subunit configured for calculating a power loss of each device based on the operation data corresponding to the abnormal photovoltaic station, and calculating a power loss value based on the power loss of each device; and
a third calculating subunit configured for determining a number of station inverters and unit state data of the station inverters based on the operation data corresponding to the abnormal photovoltaic station, and calculating the inverter operation state statistical value based on the number of station inverters and the unit state data of the station inverters.

In some optional embodiments, the third calculating unit further includes:
a fourth calculating subunit configured for determining station inverter output powers based on the operation data corresponding to the abnormal photovoltaic station, and calculating an inverter output power dispersion ratio based on the station inverter output powers and the number of station inverters;
a fifth calculating subunit configured for determining an input power quantity of the station inverter, a photovoltaic array effective area and a total radiation quantity of an inclined plane based on the operation data corresponding to the abnormal photovoltaic station, and calculating a photovoltaic array efficiency based on the input power quantity of the station inverter, the photovoltaic array effective area and the total radiation quantity of the inclined plane;
a sixth calculating subunit configured for determining an inverter direct current side power and an inverter alternating current side power based on the operation data corresponding to the abnormal photovoltaic station, and calculating an inverter loss value based on the inverter direct current side power and the inverter alternating current side power; and
a seventh calculating subunit configured for determining a daily power generation capacity of the station inverter based on the operation data corresponding to the abnormal photovoltaic station, and determining an inverter outage situation based on the daily power generation capacity of the station inverter.

In some optional embodiments, the fourth calculating subunit is specifically configured for determining a standard deviation and an average value of the station inverter output powers based on the station inverter output powers and the number of station inverters, and calculating the inverter output power dispersion ratio based on the standard deviation and the average value of the station inverter output powers.

In some optional embodiments, the comparing unit includes:

a comparing subunit configured for comparing the resource change value with a preset resource threshold, and determining the diagnosis result of the photovoltaic power generation abnormality being caused by resource fluctuation in the case that the resource change value is greater than the preset resource threshold;

a second determining subunit configured for determining a power loss due to failure, a power loss due to overhaul, a power loss due to power restriction and a power loss due to accompanying shutdown based on the power loss value;

a third determining subunit configured for determining a day-on-day ratio of shutdown duration due to failure, a day-on-day ratio of normal shutdown duration, a day-on-day ratio of shutdown duration due to power restriction and a day-on-day ratio of shutdown duration due to external factors based on the inverter operation state statistical value;

a first diagnosis subunit configured for, in the case that the power loss due to failure is greater than a preset power loss threshold, or the day-on-day ratio of the shutdown duration due to failure is less than a preset shutdown duration threshold, determining the diagnosis result of the photovoltaic power generation abnormality being that the photovoltaic power generation abnormality is caused by failure;

a second diagnosis subunit configured for, in the case that the power loss due to overhaul is less than the preset power loss threshold, or the day-on-day ratio of the normal shutdown duration is less than the preset shutdown duration threshold, determining the diagnosis result of the photovoltaic power generation abnormality being that the photovoltaic power generation abnormality is caused by overhaul;

a third diagnosis subunit configured for, in the case that the power loss due to power restriction is less than the preset power loss threshold, or the day-on-day ratio of the shutdown duration due to power restriction is less than the preset shutdown duration threshold, determining the diagnosis result of the photovoltaic power generation abnormality being that the photovoltaic power generation abnormality is caused by power restriction; and a fourth diagnosis subunit configured for, in the case that the power loss due to accompanying shutdown is less than the preset power loss threshold, or the day-on-day ratio of the shutdown duration due to external factors is less than the preset shutdown duration threshold, determining the diagnosis result of the photovoltaic power generation abnormality being that the photovoltaic power generation abnormality is caused by accompanying shutdown.

Further functional descriptions of the above-mentioned modules and units are the same as those of the above-mentioned corresponding embodiments, and will not be repeated here.

The abnormality diagnosis for photovoltaic power generation in the embodiment is presented in the form of functional units, where the units refer to Application Specific Integrated Circuit (ASIC), processors and memories that execute one or more software or fixed programs, and/or other devices that can provide the above functions.

The embodiments of the present disclosure further provide a computer device which is provided with the abnormality diagnosis apparatus for photovoltaic power generation as shown in FIG. 10.

Figure 11:
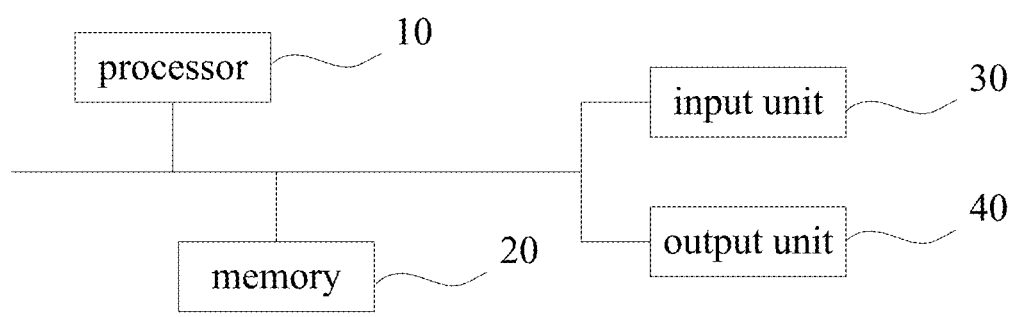
FIG. 11 is a schematic structure diagram of a computer device according to the embodiments of the present disclosure.

Please refer to FIG. 11, which is a schematic structural diagram of a computer device provided by an optional embodiment of the present disclosure. As shown in FIG. 11, the computer device includes: one or more processors 10, a memory 20 and interfaces for connecting various components, including a high-speed interface and a low-speed interface. The various components are interconnected using different buses and may be mounted on a common motherboard or otherwise as desired. The processor may process instructions for execution within the computer device, including instructions stored in the memory or on the memory to display graphical information of a Graphical User Interface (GUI) on an external input/output device (such as a display device coupled to the interface). In some optional embodiments, multiple processors and/or multiple buses may be used with multiple memories and multiple memories, if necessary. Similarly, multiple computer devices may be connected, and each device provides some necessary operations (for example, as an array of servers, a group of blade servers, or a multiprocessor system). In FIG. 11, one processor 10 is taken as an example.

The processor 10 may be a central processing unit, a network processor or a combination thereof. The processor 10 may also further include a hardware chip. The above-mentioned hardware chip may be an application-specific integrated circuit, a programmable logic device or a combination thereof. The above-mentioned programmable logic device may be a complex programmable logic device, a field programmable logic gate array, a generic array logic or any combination thereof.

The memory 20 stores an instruction executable by the at least one processor 10 to enable the at least one processor 10 to execute the method shown in the above embodiments.

The memory 20 may include a program storage region and a data storage region, wherein the program storage region may store application programs required by an operating system and at least one function. The data storage area may store data and the like created according to the use of the computer device. In addition, the memory 20 may include a high-speed random access memory, and may also include a non-transitory memory, such as at least one disk memory device, a flash memory device, or other non-transitory solid state memory device. In some optional embodiments, the memory 20 may optionally include a memory remotely arranged relative to the processor 10, and these remote memories may be connected to the computer device through a network. Examples of the networks above include, but are not limited to, the Internet, intranet, local area networks, mobile communication networks, and combinations thereof.

The memory 20 may include a volatile memory, for example, a random access memory. The memory may also include a non-volatile memory, such as a flash memory, hard disk or a solid state hard disk. The memory 20 may also include a combination of the various memories above.

The computer device further includes an input unit 30 and an output unit 40. The processor 10, the memory 20, the input unit 30, and the output unit 40 may be connected via a bus or otherwise. Bus connection is taken as an example in FIG. 11.

The input unit 30 may receive input numeric or character information and generate key signal inputs related to user settings and function control of the computer device, such as a touch screen, a keypad, a mouse, a track pad, a touch pad, a pointing stick, one or more mouse buttons, a trackball, a joystick and the like. The output unit 40 may include a display device, an auxiliary lighting device (for example, an LED), a tactile feedback device (for example, a vibration motor), and the like. The above display devices include, but are not limited to, a liquid crystal display, a light emitting diode, a display and a plasma display. In some optional embodiments, the display device may be a touch screen.

The embodiments of the present disclosure further provide a computer-readable storage medium and the method according to the embodiments of the present disclosure can be implemented in hardware or firmware, or can be recorded in a storage medium, or can be implemented in computer codes originally stored in a remote storage medium or a non-temporary machine-readable storage medium and to be stored in a local storage medium downloaded through a network, so that the method described herein can be processed by such software stored on a storage medium using a general purpose computer, a special purpose processor, or programmable or special purpose hardware. The storage medium may be a magnetic disk, an optical disk, a read-only memory, a random access memory, a flash memory, a hard disk or a solid state hard disk. Further, the storage medium may also include a combination of the various memories mentioned above. It can be understood that a computer, a processor, a microprocessor controller or programmable hardware includes a storage component that can store or receive software or computer codes, and when the software or the computer code is accessed and executed by the computer, the processor or the hardware, the method shown in the above embodiments is realized.

The invention claimed is:

1. An abnormality diagnosis method for photovoltaic power generation, comprising:
step 1: acquiring operation data of a photovoltaic station, generating a photovoltaic power generation capacity prediction model by training a preset neural network based on the operation data of the photovoltaic station;
step 2: determining an abnormal photovoltaic station by performing daily power generation capacity fluctuation evaluation and power generation efficiency evaluation on a plurality of photovoltaic stations using the photovoltaic power generation capacity prediction model; and
step 3: generating a diagnosis result of a photovoltaic power generation abnormality by comparing the operation data corresponding to the abnormal photovoltaic station with an abnormality condition;
wherein the operation data of the photovoltaic station comprises average daily irradiance data, battery temperature data and weather data;
wherein the generating the photovoltaic power generation capacity prediction model comprises:
A1: generating filtered average daily irradiance data by filtering the average daily irradiance data;
A2: determining a photovoltaic station correction coefficient based on the filtered average daily irradiance data and the battery temperature data;
A3: generating a power temperature correction coefficient by training the preset neural network based on the photovoltaic station correction coefficient and the weather data; and
A4: generating the photovoltaic power generation capacity prediction model based on the filtered average daily irradiance data, the photovoltaic station correction coefficient and the power temperature correction coefficient;
wherein an expression of the photovoltaic power generation capacity prediction model is shown as follows:

$$PE_d = k \times P_{predTarg} \times \frac{G_{meas}}{G_{TRC}} \times [1 + \delta(T_C - T_{TRC}) \times 24];$$

wherein $PE_d$ represents a predicted power generation capacity of the photovoltaic station on a current day, k represents the photovoltaic station correction coefficient, $P_{predTarg}$ represents a power generation capacity of a photovoltaic component under a target environmental condition, $G_{meas}$ represents unit area irradiance of the photovoltaic component in the same plane, $G_{TRC}$ represents average daily irradiance corresponding to the power generation capacity of the photovoltaic component under the target environmental condition, $\delta$ represents the power temperature correction coefficient, $T_C$ represents a measured battery temperature value of the photovoltaic component, and $T_{TRC}$ represents a battery temperature value corresponding to the power generation capacity of the photovoltaic component under the target environmental condition;
wherein the step 2 comprises:
B1: acquiring power generation capacities of the photovoltaic station on the current day and a previous day, and calculating a daily power generation capacity fluctuating value based on the power generation capacities of the photovoltaic station on the current day and a previous day;
B2: collecting real-time operation data of the photovoltaic station, and generating the predicted power generation capacity of the photovoltaic station on the current day by inputting the real-time operation data of the photovoltaic station into the photovoltaic power generation capacity prediction model;
B3: calculating a power generation efficiency of the photovoltaic station based on the predicted power generation capacity of the photovoltaic station on the current day and a real-time power generation capacity of the photovoltaic station on the current day; and
B4: identifying the abnormal photovoltaic station based on the daily power generation capacity fluctuating value and the power generation efficiency of the photovoltaic station;
wherein identifying the abnormal photovoltaic station based on the daily power generation capacity fluctuating value and the power generation efficiency of the photovoltaic station comprises:
comparing the daily power generation capacity fluctuating value and the power generation efficiency of the photovoltaic station with a preset power generation threshold respectively;
in the case that the daily power generation capacity fluctuating value and the power generation efficiency of the photovoltaic station are greater than the preset threshold, identifying the abnormal photovoltaic station;
wherein the step 3 comprises:
C1: calculating an operational indicator value of the photovoltaic station based on the operation data corresponding to the abnormal photovoltaic station; and
C2: generating the diagnosis result of the photovoltaic power generation abnormality by comparing the operational indicator value of the photovoltaic station with the abnormality condition;
wherein calculating the operational indicator value of the photovoltaic station based on the operation data corresponding to the abnormal photovoltaic station comprises:

c1: determining average daily irradiance of the abnormal photovoltaic station on the current day and average daily irradiance of the abnormal photovoltaic station on the previous day based on the operation data corresponding to the abnormal photovoltaic station, and calculating a day-on-day change rate of resources based on the average daily irradiance on the current day and the average daily irradiance on the previous day;

c2: determining a power loss of the abnormal photovoltaic station on the current day and a power loss of the abnormal photovoltaic station on the previous day based on the operation data corresponding to the abnormal photovoltaic station; and c3: determining a number of station inverters and unit state data of the station inverters based on the operation data corresponding to the abnormal photovoltaic station, and calculating the inverter operation state statistical value on the current day and the inverter operation state statistical value on the previous day based on the number of station inverters and the unit state data of the station inverters;

wherein the operational indicator value of the photovoltaic station further comprises an inverter output power dispersion ratio, a photovoltaic array energy conversion efficiency, an inverter loss rate and an inverter outage situation; and calculating the operational indicator value of the photovoltaic station based on the operation data corresponding to the abnormal photovoltaic station further comprises:

c4: determining station inverter output powers based on the operation data corresponding to the abnormal photovoltaic station, and calculating an inverter output power dispersion ratio of a whole station based on the station inverter output powers;

c5: determining a direct current power quantity of the station inverter, a photovoltaic array effective area and a total radiation quantity of an inclined plane based on the operation data corresponding to the abnormal photovoltaic station, and calculating the photovoltaic array energy conversion efficiency based on the direct current power quantity of the station inverter, the photovoltaic array effective area and the total radiation quantity of the inclined plane;

c6: determining an inverter direct current side power and an inverter alternating current side power based on the operation data corresponding to the abnormal photovoltaic station, and calculating the inverter loss rate based on the inverter direct current side power and the inverter alternating current side power; and c7: determining a daily power generation capacity of the station inverter based on the operation data corresponding to the abnormal photovoltaic station, and determining the inverter outage situation based on the daily power generation capacity of the station inverter;

wherein in the step c4, a standard deviation and an average value of the station inverter output powers are determined based on the station inverter output powers and the number of station inverters, and the inverter output power dispersion ratio of the whole station is calculated based on the standard deviation and the average value of the station inverter output powers;

wherein the step C2 comprises:

c2.1: comparing the day-on-day change rate of resources with a preset resource threshold, and determining the diagnosis result of the photovoltaic power generation abnormality being that the photovoltaic power generation abnormality is caused by resource fluctuation in the case that the day-on-day change rate of resources is greater than the preset resource threshold;

c2.2: determining proportions and day-on-day ratios of a power loss due to failure, a power loss due to overhaul, a power loss due to power restriction and a power loss due to accompanying shutdown based on a power loss value on the current day and a power loss value on previous day and a power generation capacity value of the abnormal photovoltaic station;

c2.3: determining a day-on-day ratio of shutdown duration due to the failure, a day-on-day ratio of normal shutdown duration, a day-on-day ratio of shutdown duration due to the power restriction and a day-on-day ratio of shutdown duration due to external factors based on the inverter operation state statistical value;

c2.4: in the case that the proportion of the power loss due to the failure is greater than a preset threshold, or the proportion of the shutdown duration due to the failure is greater than a preset shutdown duration threshold, determining the diagnosis result of the photovoltaic power generation abnormality being that the photovoltaic power generation abnormality is caused by device failure;

in the case that the proportion of the power loss due to the overhaul is greater than a preset power loss threshold, or the proportion or the day-on-day ratio of the normal shutdown duration due to the failure is greater than the preset shutdown duration threshold, determining the diagnosis result of the photovoltaic power generation abnormality being that the photovoltaic power generation abnormality is caused by the overhaul;

in the case that the proportion of the power loss due to the power restriction is greater than the preset power loss threshold, or the proportion or the day-on-day ratio of the shutdown duration due to the power restriction is greater than the preset shutdown duration threshold, determining the diagnosis result of the photovoltaic power generation abnormality being that the photovoltaic power generation abnormality is caused by the power restriction; and in the case that the proportion of the power loss due to accompanying shutdown is greater than the preset power loss threshold, or the proportion or the day-on-day ratio of the shutdown duration due to the external factors is greater than the preset shutdown duration threshold, determining the diagnosis result of the photovoltaic power generation abnormality being that the photovoltaic power generation abnormality is caused by the accompanying shutdown.

2. The abnormality diagnosis method for photovoltaic power generation according to claim 1, wherein the step A1 comprises:

a1: acquiring power generation capacity data corresponding to the average daily irradiance data, and determining a daily power generation capacity of the photovoltaic station and average daily irradiance of the photovoltaic station by filtering the average daily irradiance data and the power generation capacity data greater than preset thresholds;

a2: identifying irradiance abnormality points based on the daily power generation capacity of the photovoltaic station and the average daily irradiance of the photovoltaic station, and filtering the irradiance abnormality points;

wherein identifying irradiance abnormality points based on the daily power generation capacity of the photovoltaic station and the average daily irradiance of the photovoltaic station, and filtering the irradiance abnormality points comprises:
dividing the daily power generation capacity of the station into a plurality of power generation capacity intervals;
mapping the average daily irradiance of the station to the plurality of power generation capacity intervals;
generating irradiance in each power generation capacity interval:
determining a segmented box plot based on the irradiance in each power generation capacity interval; and
identifying the irradiance abnormality points based on the segmented box plot, wherein the irradiance abnormality points is outlier exceeding a maximum observed value or a minimum observed value of the segmented box plot;
a3: generating a pre-training result by pre-training the preset neural network based on the irradiance data after filtering the irradiance abnormality points; and
a4: determining outliers of irradiance data after filtering the irradiance abnormality points based on the pre-training result, and generating the filtered average daily irradiance data by deleting the outliers.

3. The abnormality diagnosis method for photovoltaic power generation according to claim 2, wherein the step a2 comprises:
a2.1: generating irradiance in each power generation capacity interval by dividing the daily power generation capacity of the photovoltaic station into a plurality of power generation capacity intervals and mapping the average daily irradiance of the photovoltaic station to the plurality of power generation capacity intervals; and
a2.2: determining a segmented box plot based on the irradiance in each power generation capacity interval, and identifying and filtering the irradiance abnormality points based on the segmented box plot.

4. The abnormality diagnosis method for photovoltaic power generation according to claim 1, wherein in the step A2, the photovoltaic station correction coefficient is generated using a linear regression method based on the filtered average daily irradiance data and the battery temperature data.

5. A computer device, comprising:
a processor and a memory, wherein the memory and the processor are connected in communication with each other, a computer instruction is stored in the memory, and the processor executes the computer instruction, thereby executing:
step 1: acquiring operation data of a photovoltaic station, generating a photovoltaic power generation capacity prediction model by training a preset neural network based on the operation data of the photovoltaic station;
step 2: determining an abnormal photovoltaic station by performing daily power generation capacity fluctuation evaluation and power generation efficiency evaluation on a plurality of photovoltaic stations using the photovoltaic power generation capacity prediction model; and
step 3: generating a diagnosis result of a photovoltaic power generation abnormality by comparing the operation data corresponding to the abnormal photovoltaic station with an abnormality condition;
wherein the operation data of the photovoltaic station comprises average daily irradiance data, battery temperature data and weather data;
wherein the generating the photovoltaic power generation capacity prediction model comprises:
A1: generating filtered average daily irradiance data by filtering the average daily irradiance data;
A2: determining a photovoltaic station correction coefficient based on the filtered average daily irradiance data and the battery temperature data;
A3: generating a power temperature correction coefficient by training the preset neural network based on the photovoltaic station correction coefficient and the weather data; and
A4: generating the photovoltaic power generation capacity prediction model based on the filtered average daily irradiance data, the photovoltaic station correction coefficient and the power temperature correction coefficient;
wherein an expression of the photovoltaic power generation capacity prediction model is shown as follows:

$$PE_d = k \times P_{predTarg} \times \frac{G_{meas}}{G_{TRC}} \times [1 + \delta(T_C - T_{TRC}) \times 24];$$

wherein $PE_d$ represents a predicted power generation capacity of the photovoltaic station on a current day, k represents the photovoltaic station correction coefficient, $P_{predTarg}$ represents a power generation capacity of a photovoltaic component under a target environmental condition, $G_{meas}$ represents unit area irradiance of the photovoltaic component in the same plane, $G_{TRC}$ represents average daily irradiance corresponding to the power generation capacity of the photovoltaic component under the target environmental condition, $\delta$ represents the power temperature correction coefficient, $T_C$ represents a measured battery temperature value of the photovoltaic component, and $T_{TRC}$ represents a battery temperature value corresponding to the power generation capacity of the photovoltaic component under the target environmental condition;
wherein the step 2 comprises:
B1: acquiring power generation capacities of the photovoltaic station on the current day and a previous day, and calculating a daily power generation capacity fluctuating value based on the power generation capacities of the photovoltaic station on the current day and a previous day;
B2: collecting real-time operation data of the photovoltaic station, and generating the predicted power generation capacity of the photovoltaic station on the current day by inputting the real-time operation data of the photovoltaic station into the photovoltaic power generation capacity prediction model;
B3: calculating a power generation efficiency of the photovoltaic station based on the predicted power generation capacity of the photovoltaic station on the current day and a real-time power generation capacity of the photovoltaic station on the current day; and
B4: identifying the abnormal photovoltaic station based on the daily power generation capacity fluctuating value and the power generation efficiency of the photovoltaic station;
wherein identifying the abnormal photovoltaic station based on the daily power generation capacity fluctuating value and the power generation efficiency of the photovoltaic station comprises:

comparing the daily power generation capacity fluctuating value and the power generation efficiency of the photovoltaic station with a preset power generation threshold respectively;

in the case that the daily power generation capacity fluctuating value and the power generation efficiency of the photovoltaic station are greater than the preset threshold, identifying the abnormal photovoltaic station;

wherein the step 3 comprises:

C1: calculating an operational indicator value of the photovoltaic station based on the operation data corresponding to the abnormal photovoltaic station; and C2: generating the diagnosis result of the photovoltaic power generation abnormality by comparing the operational indicator value of the photovoltaic station with the abnormality condition;

wherein calculating the operational indicator value of the photovoltaic station based on the operation data corresponding to the abnormal photovoltaic station comprises:

c1: determining average daily irradiance of the abnormal photovoltaic station on the current day and average daily irradiance of the abnormal photovoltaic station on the previous day based on the operation data corresponding to the abnormal photovoltaic station, and calculating a day-on-day change rate of resources based on the average daily irradiance on the current day and the average daily irradiance on the previous day;

c2: determining a power loss of the abnormal photovoltaic station on the current day and a power loss of the abnormal photovoltaic station on the previous day based on the operation data corresponding to the abnormal photovoltaic station; and c3: determining a number of station inverters and unit state data of the station inverters based on the operation data corresponding to the abnormal photovoltaic station, and calculating the inverter operation state statistical value on the current day and the inverter operation state statistical value on the previous day based on the number of station inverters and the unit state data of the station inverters;

wherein the operational indicator value of the photovoltaic station further comprises an inverter output power dispersion ratio, a photovoltaic array energy conversion efficiency, an inverter loss rate and an inverter outage situation; and calculating the operational indicator value of the photovoltaic station based on the operation data corresponding to the abnormal photovoltaic station further comprises:

c4: determining station inverter output powers based on the operation data corresponding to the abnormal photovoltaic station, and calculating an inverter output power dispersion ratio of a whole station based on the station inverter output powers;

c5: determining a direct current power quantity of the station inverter, a photovoltaic array effective area and a total radiation quantity of an inclined plane based on the operation data corresponding to the abnormal photovoltaic station, and calculating the photovoltaic array energy conversion efficiency based on the direct current power quantity of the station inverter, the photovoltaic array effective area and the total radiation quantity of the inclined plane;

c6: determining an inverter direct current side power and an inverter alternating current side power based on the operation data corresponding to the abnormal photovoltaic station, and calculating the inverter loss rate based on the inverter direct current side power and the inverter alternating current side power; and c7: determining a daily power generation capacity of the station inverter based on the operation data corresponding to the abnormal photovoltaic station, and determining the inverter outage situation based on the daily power generation capacity of the station inverter;

wherein in the step c4, a standard deviation and an average value of the station inverter output powers are determined based on the station inverter output powers and the number of station inverters, and the inverter output power dispersion ratio of the whole station is calculated based on the standard deviation and the average value of the station inverter output powers;

wherein the step C2 comprises:

c2.1: comparing the day-on-day change rate of resources with a preset resource threshold, and determining the diagnosis result of the photovoltaic power generation abnormality being that the photovoltaic power generation abnormality is caused by resource fluctuation in the case that the day-on-day change rate of resources is greater than the preset resource threshold;

c2.2: determining proportions and day-on-day ratios of a power loss due to failure, a power loss due to overhaul, a power loss due to power restriction and a power loss due to accompanying shutdown based on a power loss value on the current day and a power loss value on previous day and a power generation capacity value of the abnormal photovoltaic station;

c2.3: determining a day-on-day ratio of shutdown duration due to the failure, a day-on-day ratio of normal shutdown duration, a day-on-day ratio of shutdown duration due to the power restriction and a day-on-day ratio of shutdown duration due to external factors based on the inverter operation state statistical value;

c2.4: in the case that the proportion of the power loss due to the failure is greater than a preset threshold, or the proportion of the shutdown duration due to the failure is greater than a preset shutdown duration threshold, determining the diagnosis result of the photovoltaic power generation abnormality being that the photovoltaic power generation abnormality is caused by device failure;

in the case that the proportion of the power loss due to the overhaul is greater than a preset power loss threshold, or the proportion or the day-on-day ratio of the normal shutdown duration due to the failure is greater than the preset shutdown duration threshold, determining the diagnosis result of the photovoltaic power generation abnormality being that the photovoltaic power generation abnormality is caused by the overhaul;

in the case that the proportion of the power loss due to the power restriction is greater than the preset power loss threshold, or the proportion or the day-on-day ratio of the shutdown duration due to the power restriction is greater than the preset shutdown duration threshold, determining the diagnosis result of the photovoltaic power generation abnormality being that the photovoltaic power generation abnormality is caused by the power restriction; and in the case that the proportion of the power loss due to accompanying shutdown is greater than the preset power loss threshold, or the proportion or the day-on-day ratio of the shutdown duration due to the external factors is greater than the preset shutdown duration threshold, determining the diagnosis result of the photovoltaic power generation abnormality being that the photovoltaic power generation abnormality is caused by the accompanying shutdown.

6. The computer device according to claim 5, wherein the step A1 comprises:
   a1: acquiring power generation capacity data corresponding to the average daily irradiance data, and determining a daily power generation capacity of the photovoltaic station and average daily irradiance of the photovoltaic station by filtering the average daily irradiance data and the power generation capacity data greater than preset thresholds;
   a2: identifying irradiance abnormality points based on the daily power generation capacity of the photovoltaic station and the average daily irradiance of the photovoltaic station, and filtering the irradiance abnormality points;
   wherein identifying irradiance abnormality points based on the daily power generation capacity of the photovoltaic station and the average daily irradiance of the photovoltaic station, and filtering the irradiance abnormality points comprises:
   dividing the daily power generation capacity of the station into a plurality of power generation capacity intervals;
   mapping the average daily irradiance of the station to the plurality of power generation capacity intervals;
   generating irradiance in each power generation capacity interval;
   determining a segmented box plot based on the irradiance in each power generation capacity interval; and
   identifying the irradiance abnormality points based on the segmented box plot, wherein the irradiance abnormality points is outlier exceeding a maximum observed value or a minimum observed value of the segmented box plot;
   a3: generating a pre-training result by pre-training the preset neural network based on the irradiance data after filtering the irradiance abnormality points; and
   a4: determining outliers of irradiance data after filtering the irradiance abnormality points based on the pre-training result, and generating the filtered average daily irradiance data by deleting the outliers.

7. The computer device according to claim 6, wherein the step a2 comprises:
   a2.1: generating irradiance in each power generation capacity interval by dividing the daily power generation capacity of the photovoltaic station into a plurality of power generation capacity intervals and mapping the average daily irradiance of the photovoltaic station to the plurality of power generation capacity intervals; and
   a2.2: determining a segmented box plot based on the irradiance in each power generation capacity interval, and identifying and filtering the irradiance abnormality points based on the segmented box plot.

8. The computer device according to claim 5, wherein in the step A2, the photovoltaic station correction coefficient is generated using a linear regression method based on the filtered average daily irradiance data and the battery temperature data.

9. A non-volatile computer-readable storage medium, wherein the computer-readable storage medium stores a computer instruction thereon, and the computer instruction is used to enable a computer to execute:
   step 1: acquiring operation data of a photovoltaic station, generating a photovoltaic power generation capacity prediction model by training a preset neural network based on the operation data of the photovoltaic station;
   step 2: determining an abnormal photovoltaic station by performing daily power generation capacity fluctuation evaluation and power generation efficiency evaluation on a plurality of photovoltaic stations using the photovoltaic power generation capacity prediction model; and
   step 3: generating a diagnosis result of a photovoltaic power generation abnormality by comparing the operation data corresponding to the abnormal photovoltaic station with an abnormality condition;
   wherein the operation data of the photovoltaic station comprises average daily irradiance data, battery temperature data and weather data;
   wherein the generating the photovoltaic power generation capacity prediction model comprises:
   A1: generating filtered average daily irradiance data by filtering the average daily irradiance data;
   A2: determining a photovoltaic station correction coefficient based on the filtered average daily irradiance data and the battery temperature data;
   A3: generating a power temperature correction coefficient by training the preset neural network based on the photovoltaic station correction coefficient and the weather data; and
   A4: generating the photovoltaic power generation capacity prediction model based on the filtered average daily irradiance data, the photovoltaic station correction coefficient and the power temperature correction coefficient;
   wherein an expression of the photovoltaic power generation capacity prediction model is shown as follows:

$$PE_d = k \times P_{predTarg} \times \frac{G_{meas}}{G_{TRC}} \times [1 + \delta(T_C - T_{TRC}) \times 24];$$

wherein $PE_d$ represents a predicted power generation capacity of the photovoltaic station on a current day, k represents the photovoltaic station correction coefficient, $P_{predTarg}$ represents a power generation capacity of a photovoltaic component under a target environmental condition, $G_{meas}$ represents unit area irradiance of the photovoltaic component in the same plane, $G_{TRC}$ represents average daily irradiance corresponding to the power generation capacity of the photovoltaic component under the target environmental condition, $\delta$ represents the power temperature correction coefficient, $T_C$ represents a measured battery temperature value of the photovoltaic component, and $T_{TRC}$ represents a battery temperature value corresponding to the power generation capacity of the photovoltaic component under the target environmental condition;

wherein the step 2 comprises:
B1: acquiring power generation capacities of the photovoltaic station on the current day and a previous day, and calculating a daily power generation capacity fluctuating value based on the power generation capacities of the photovoltaic station on the current day and a previous day;
B2: collecting real-time operation data of the photovoltaic station, and generating the predicted power generation capacity of the photovoltaic station on the current day by inputting the real-time operation data of the photovoltaic station into the photovoltaic power generation capacity prediction model;

B3: calculating a power generation efficiency of the photovoltaic station based on the predicted power generation capacity of the photovoltaic station on the current day and a real-time power generation capacity of the photovoltaic station on the current day; and B4: identifying the abnormal photovoltaic station based on the daily power generation capacity fluctuating value and the power generation efficiency of the photovoltaic station;

wherein identifying the abnormal photovoltaic station based on the daily power generation capacity fluctuating value and the power generation efficiency of the photovoltaic station comprises:

comparing the daily power generation capacity fluctuating value and the power generation efficiency of the photovoltaic station with a preset power generation threshold respectively;

in the case that the daily power generation capacity fluctuating value and the power generation efficiency of the photovoltaic station are greater than the preset threshold, identifying the abnormal photovoltaic station;

wherein the step 3 comprises:

C1: calculating an operational indicator value of the photovoltaic station based on the operation data corresponding to the abnormal photovoltaic station; and C2: generating the diagnosis result of the photovoltaic power generation abnormality by comparing the operational indicator value of the photovoltaic station with the abnormality condition;

wherein calculating the operational indicator value of the photovoltaic station based on the operation data corresponding to the abnormal photovoltaic station comprises:

c1: determining average daily irradiance of the abnormal photovoltaic station on the current day and average daily irradiance of the abnormal photovoltaic station on the previous day based on the operation data corresponding to the abnormal photovoltaic station, and calculating a day-on-day change rate of resources based on the average daily irradiance on the current day and the average daily irradiance on the previous day;

c2: determining a power loss of the abnormal photovoltaic station on the current day and a power loss of the abnormal photovoltaic station on the previous day based on the operation data corresponding to the abnormal photovoltaic station; and c3: determining a number of station inverters and unit state data of the station inverters based on the operation data corresponding to the abnormal photovoltaic station, and calculating the inverter operation state statistical value on the current day and the inverter operation state statistical value on the previous day based on the number of station inverters and the unit state data of the station inverters;

wherein the operational indicator value of the photovoltaic station further comprises an inverter output power dispersion ratio, a photovoltaic array energy conversion efficiency, an inverter loss rate and an inverter outage situation; and calculating the operational indicator value of the photovoltaic station based on the operation data corresponding to the abnormal photovoltaic station further comprises:

c4: determining station inverter output powers based on the operation data corresponding to the abnormal photovoltaic station, and calculating an inverter output power dispersion ratio of a whole station based on the station inverter output powers;

c5: determining a direct current power quantity of the station inverter, a photovoltaic array effective area and a total radiation quantity of an inclined plane based on the operation data corresponding to the abnormal photovoltaic station, and calculating the photovoltaic array energy conversion efficiency based on the direct current power quantity of the station inverter, the photovoltaic array effective area and the total radiation quantity of the inclined plane;

c6: determining an inverter direct current side power and an inverter alternating current side power based on the operation data corresponding to the abnormal photovoltaic station, and calculating the inverter loss rate based on the inverter direct current side power and the inverter alternating current side power; and c7: determining a daily power generation capacity of the station inverter based on the operation data corresponding to the abnormal photovoltaic station, and determining the inverter outage situation based on the daily power generation capacity of the station inverter;

wherein in the step c4, a standard deviation and an average value of the station inverter output powers are determined based on the station inverter output powers and the number of station inverters, and the inverter output power dispersion ratio of the whole station is calculated based on the standard deviation and the average value of the station inverter output powers;

wherein the step C2 comprises:

c2.1: comparing the day-on-day change rate of resources with a preset resource threshold, and determining the diagnosis result of the photovoltaic power generation abnormality being that the photovoltaic power generation abnormality is caused by resource fluctuation in the case that the day-on-day change rate of resources is greater than the preset resource threshold;

c2.2: determining proportions and day-on-day ratios of a power loss due to failure, a power loss due to overhaul, a power loss due to power restriction and a power loss due to accompanying shutdown based on a power loss value on the current day and a power loss value on previous day and a power generation capacity value of the abnormal photovoltaic station;

c2.3: determining a day-on-day ratio of shutdown duration due to the failure, a day-on-day ratio of normal shutdown duration, a day-on-day ratio of shutdown duration due to the power restriction and a day-on-day ratio of shutdown duration due to external factors based on the inverter operation state statistical value;

c2.4: in the case that the proportion of the power loss due to the failure is greater than a preset threshold, or the proportion of the shutdown duration due to the failure is greater than a preset shutdown duration threshold, determining the diagnosis result of the photovoltaic power generation abnormality being that the photovoltaic power generation abnormality is caused by device failure;

in the case that the proportion of the power loss due to the overhaul is greater than a preset power loss threshold, or the proportion or the day-on-day ratio of the normal shutdown duration due to the failure is greater than the preset shutdown duration threshold, determining the diagnosis result of the photovoltaic power generation abnormality being that the photovoltaic power generation abnormality is caused by the overhaul;

in the case that the proportion of the power loss due to the power restriction is greater than the preset power loss threshold, or the proportion or the day-on-day ratio of the shutdown duration due to the power restriction is greater than the preset shutdown duration threshold, determining the diagnosis result of the photovoltaic power generation abnormality being that the photovoltaic power generation abnormality is caused by the power restriction; and in the case that the proportion of the power loss due to accompanying shutdown is greater than the preset power loss threshold, or the proportion or the day-on-day ratio of the shutdown duration due to the external factors is greater than the preset shutdown duration threshold, determining the diagnosis result of the photovoltaic power generation abnormality being that the photovoltaic power generation abnormality is caused by the accompanying shutdown.

10. The non-volatile computer-readable storage medium according to claim 9, wherein the step A1 comprises:

a1: acquiring power generation capacity data corresponding to the average daily irradiance data, and determining a daily power generation capacity of the photovoltaic station and average daily irradiance of the photovoltaic station by filtering the average daily irradiance data and the power generation capacity data greater than preset thresholds;

a2: identifying irradiance abnormality points based on the daily power generation capacity of the photovoltaic station and the average daily irradiance of the photovoltaic station, and filtering the irradiance abnormality points;

wherein identifying irradiance abnormality points based on the daily power generation capacity of the photovoltaic station and the average daily irradiance of the photovoltaic station, and filtering the irradiance abnormality points comprises:

dividing the daily power generation capacity of the station into a plurality of power generation capacity intervals:

mapping the average daily irradiance of the station to the plurality of power generation capacity intervals;

generating irradiance in each power generation capacity interval;

determining a segmented box plot based on the irradiance in each power generation capacity interval; and identifying the irradiance abnormality points based on the segmented box plot, wherein the irradiance abnormality points is outlier exceeding a maximum observed value or a minimum observed value of the segmented box plot;

a3: generating a pre-training result by pre-training the preset neural network based on the irradiance data after filtering the irradiance abnormality points; and a4: determining outliers of irradiance data after filtering the irradiance abnormality points based on the pre-training result, and generating the filtered average daily irradiance data by deleting the outliers.

11. The non-volatile computer-readable storage medium according to claim 10, wherein the step a2 comprises:

a2.1: generating irradiance in each power generation capacity interval by dividing the daily power generation capacity of the photovoltaic station into a plurality of power generation capacity intervals and mapping the average daily irradiance of the photovoltaic station to the plurality of power generation capacity intervals; and a2.2: determining a segmented box plot based on the irradiance in each power generation capacity interval, and identifying and filtering the irradiance abnormality points based on the segmented box plot.

12. The non-volatile computer-readable storage medium according to claim 9, wherein in the step A2, the photovoltaic station correction coefficient is generated using a linear regression method based on the filtered average daily irradiance data and the battery temperature data.

* * * * *